(12) United States Patent
Miyazaki et al.

(10) Patent No.: US 12,184,995 B2
(45) Date of Patent: Dec. 31, 2024

(54) IMAGING DEVICE AND IMAGING METHOD FOR PREVENTING AN UNNECESSARY EVENT

(71) Applicant: SONY SEMICONDUCTOR SOLUTIONS CORPORATION, Kanagawa (JP)

(72) Inventors: Takahiro Miyazaki, Kanagawa (JP); Takashi Yokokawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 10 days.

(21) Appl. No.: 17/907,225

(22) PCT Filed: Mar. 25, 2021

(86) PCT No.: PCT/JP2021/012452
§ 371 (c)(1),
(2) Date: Sep. 23, 2022

(87) PCT Pub. No.: WO2021/200523
PCT Pub. Date: Oct. 7, 2021

(65) Prior Publication Data
US 2023/0108884 A1 Apr. 6, 2023

(30) Foreign Application Priority Data

Apr. 1, 2020 (JP) ................ 2020-066269

(51) Int. Cl.
*H04N 25/47* (2023.01)
(52) U.S. Cl.
CPC .................. *H04N 25/47* (2023.01)

(58) Field of Classification Search
CPC ...... H04N 25/47; H04N 25/79; H04N 23/745; G01B 11/00
See application file for complete search history.

(56) References Cited

U.S. PATENT DOCUMENTS

2019/0362256 A1 11/2019 Lang et al.

FOREIGN PATENT DOCUMENTS

| JP | 2017-535999 A | 11/2017 |
| WO | 2019/135303 A1 | 7/2019 |

OTHER PUBLICATIONS

International Search Report and Written Opinion of PCT Application No. PCT/JP2021/012452, issued on Jun. 22, 2021, 09 pages of ISRWO.

*Primary Examiner* — Twyler L Haskins
*Assistant Examiner* — Angel L Garces-Rivera
(74) *Attorney, Agent, or Firm* — CHIP LAW GROUP

(57) ABSTRACT

There is provided an imaging device which includes a photoelectric conversion section including a plurality of photoelectric conversion elements, each of the plurality of photoelectric conversion elements photoelectrically convert incoming light into an electrical signal, a first detection section that detect a detection signal in a case where an absolute value of an amount of change in the electrical signal generated by each of the plurality of photoelectric conversion elements exceeds a predetermined threshold, a flicker determination section that determines whether or not a detection signal caused by a flicker of a light source is included in the detection signals detected by the first detection section, and a second detection section that detects a detection signal caused by a factor other than the flicker, in a case where it is determined that the detection signal caused by the flicker is included.

14 Claims, 32 Drawing Sheets

FIG. 23

|   |   |   |   |   |
|---|---|---|---|---|
| 0 | 1 | ••• | 1 | 0 |
| 1 | -1 | ••• | 0 | 1 |
| ⋮ | ⋮ | ⋱ | ⋮ | ⋮ |
| 0 | 2 | ••• | 1 | -1 |
| 0 | -2 | ••• | 0 | 0 |

59a — top-left cell region
59 — middle region

IMAGING DEVICE AND IMAGING METHOD FOR PREVENTING AN UNNECESSARY EVENT

CROSS REFERENCE TO RELATED APPLICATIONS

This application is a U.S. National Phase of International Patent Application No. PCT/JP2021/012452 filed on Mar. 25, 2021, which claims priority benefit of Japanese Patent Application No. JP 2020-066269 filed in the Japan Patent Office on Apr. 1, 2020. Each of the above-referenced applications is hereby incorporated herein by reference in its entirety.

TECHNICAL FIELD

The present disclosure relates to an imaging device and an imaging method.

BACKGROUND ART

As one of event-driven imaging devices, an asynchronous imaging device called a dynamic vision sensor (DVS) has been proposed (see, for example, Patent Document 1). In such an asynchronous imaging device, only when a certain event (for example, motion) occurs in a scene, data of a portion where a luminance level has changed by the event is acquired. Therefore, the asynchronous imaging device can acquire image data much faster than a typical synchronous imaging device that unnecessarily acquires all data of images at a fixed frame rate.

CITATION LIST

Patent Document

Patent Document 1: Japanese Patent Application Laid-Open (Translation of PCT Application) No. 2017-535999

SUMMARY OF THE INVENTION

Problems to be Solved by the Invention

Lighting fixtures such as fluorescent lamps and light emitting devices (LEDs) change in lighting intensity in synchronization with a frequency of a commercial power supply. This phenomenon is called a flicker. Since the DVS is high in sensitivity, the DVS also reacts to a change in luminance caused by a flicker of a lighting fixture such as a fluorescent lamp or an LED, so that there is a possibility that an event occurs even in a scene where there is originally no motion. Furthermore, the occurrence of an unnecessary event that is originally necessary increases the power consumption of the DVS.

It is therefore an object of the present disclosure to provide an imaging device and an imaging method having no possibility of the occurrence of an unnecessary event.

Solutions to Problems

In order to solve the above-described problems, according to the present disclosure, there is provided an imaging device including a photoelectric conversion section including a plurality of photoelectric conversion elements, each of the plurality of photoelectric conversion elements being configured to photoelectrically convert incoming light into an electrical signal, a first detection section that detect a detection signal in a case where an absolute value of an amount of change in the electrical signal generated by each of the plurality of photoelectric conversion elements exceeds a predetermined threshold, a flicker determination section that determines whether or not a detection signal caused by a flicker of a light source is included in the detection signals detected by the first detection section, and a second detection section that detects a detection signal caused by a factor other than the flicker, from among the detection signals detected by the first detection section, in a case where it is determined that the detection signal caused by the flicker is included.

The first detection section may detect a first detection signal in a case where an absolute value of an amount of upward change in a signal level of the electrical signal exceeds a first threshold, and detect a second detection signal in a case where an absolute value of an amount of downward change in the signal level of the electrical signal exceeds a second threshold, and the flicker determination section may determine whether or not the detection signal caused by the flicker is included in the detection signals detected by the first detection section on the basis of the number of the first detection signals and the number of the second detection signals detected within a predetermined period.

The first detection section may sequentially read the electrical signals of the plurality of photoelectric conversion elements, detect one of the first detection signal or the second detection signal, then detect the other of the first detection signal or the second detection signal, and count the number of the first detection signals and the number of the second detection signals over the predetermined period.

The first detection section may sequentially read the electrical signals of the plurality of photoelectric conversion elements, detect the first detection signal and the second detection signal in parallel, and count the number of the first detection signals and the number of the second detection signals over the predetermined period.

The first detection section may count, over the predetermined period, the number of the first detection signals and the number of the second detection signals for the photoelectric conversion elements each having the absolute value of the amount of change exceeding the threshold among the plurality of photoelectric conversion elements, and the flicker determination section may determine whether or not the detection signal caused by the flicker is included in the detection signals detected by the first detection section on the basis of the number of the first detection signals and the number of the second detection signals counted by the first detection section.

The first detection section may count, over the predetermined period, a difference between the number of the first detection signals and the number of the second detection signals for the photoelectric conversion elements each having the absolute value of the amount of change exceeding the threshold among the plurality of photoelectric conversion elements, and the flicker determination section may determine whether or not the detection signal caused by the flicker is included in the detection signals detected by the first detection section on the basis of the difference counted by the first detection section.

A period detection section that detects a period of the flicker in a case where the flicker determination section determines that the detection signal caused by the flicker is included, and a detection period setting section that sets a detection period of the detection signal in accordance with the period of the flicker detected by the period detection section may be further included, and the second detection section may detect the detection signal in the detection period set by the detection period setting section.

A period detection section that detects a period of the flicker in a case where the flicker determination section determines that the detection signal caused by the flicker is included, and a counter that increases or decreases a count value on the basis of the detection signal detected in the period of the flicker detected by the period detection section, and increases or decreases the count value on the basis of the detection signal detected at a timing other than the period of the flicker may be further included, and the second detection section may detect the detection signal detected due to the factor other than the flicker on the basis of the count value.

A signal selection section that selects the detection signal detected due to the factor other than the flicker on the basis of the count value in a case where the flicker determination section determines that the detection signal caused by the flicker is included, and selects the detection signal detected by the first detection section in a case where the flicker determination section determines that the detection signal caused by the flicker is not included may be further included.

The second detection section may detect, as the detection signal caused by the factor other than the flicker, the detection signal in a case where the flicker determination section determines that the detection signal caused by the flicker is included and the absolute value of the amount of downward change in a signal level of the electrical signal exceeds the second threshold within a period in which the first detection signal is detected, or in a case where the flicker determination section determines that the detection signal caused by the flicker is included and the absolute value of the amount of upward change in the signal level of the electrical signal exceeds the first threshold within a period in which the second detection signal is detected.

An output rate conversion section that converts an output rate of the detection signal detected by the second detection section may be further included.

In a case where the flicker determination section determines that the detection signal caused by the flicker is included, the second detection section may discard the detection signal caused by the flicker among the detection signals detected by the first detection section, and detect remaining detection signals.

The second detection section may discard the first detection signal and detect the second detection signal during a period in which the first detection signal is detected, and discard the second detection signal and detect the first detection signal during a period in which the second detection signal is detected.

An output selection section that selects the second detection signal detected within the period in which the first detection signal is detected and the first detection signal detected within the period in which the second detection signal is detected in a case where the flicker determination section determines that the detection signal caused by the flicker is included, and selects the detection signal detected by the first detection section in a case where the flicker determination section determines that the detection signal caused by the flicker is included may be further included.

According to the present disclosure, there is provided an imaging method including detecting a detection signal in a case where an absolute value of an amount of change in electrical signal generated by each of a plurality of photoelectric conversion elements exceeds a predetermined threshold, each of the plurality of photoelectric conversion elements being configured to photoelectrically convert incoming light into the electrical signal, determining whether or not a detection signal caused by a flicker of a light source is included in the detected detection signals, and detecting a detection signal caused by a factor other than the flicker from among the detected detection signals in a case where it is determined that the detection signal caused by the flicker is included.

BRIEF DESCRIPTION OF DRAWINGS

FIG. 23 is a diagram illustrating details of a counter map.

MODE FOR CARRYING OUT THE INVENTION

Hereinafter, embodiments of an imaging device and an imaging method will be described with reference to the drawings. Main components of the imaging device will be mainly described below, but the imaging device may include components or functions that are not illustrated or described. The following description is not intended to exclude such components or functions that are not illustrated or described.

Figure 1:
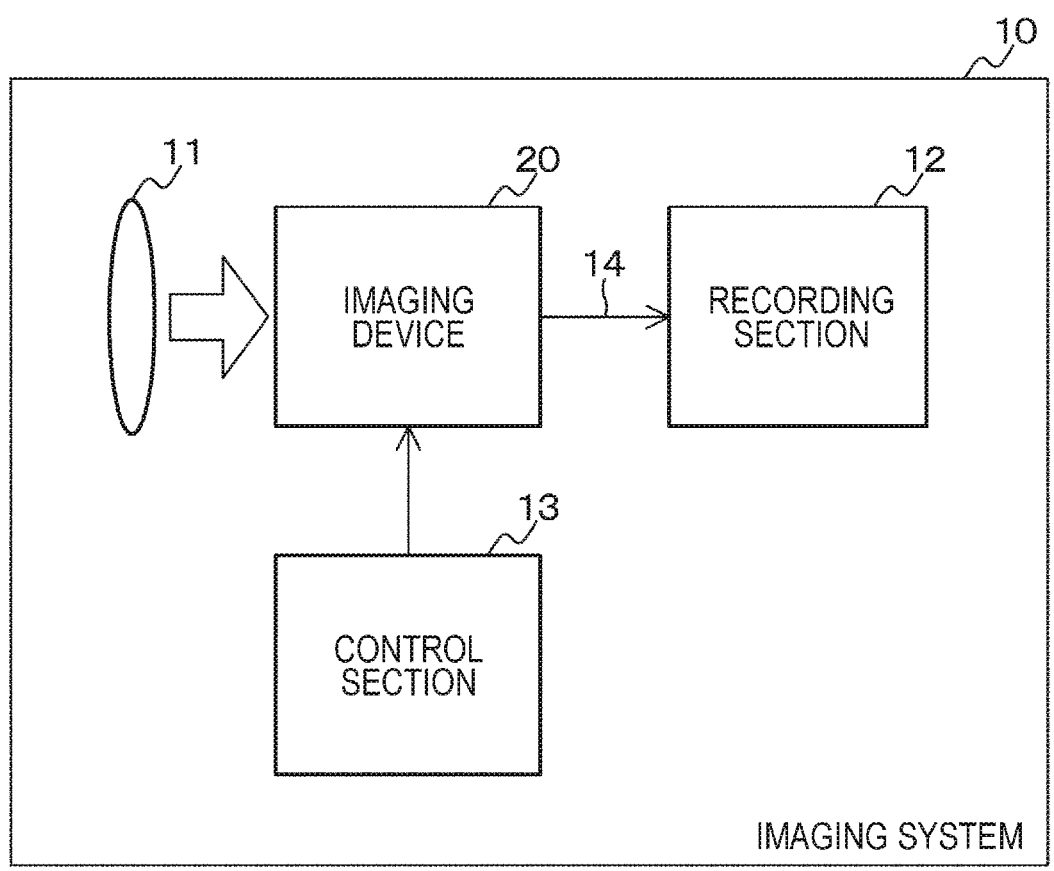
FIG. 1 is a block diagram illustrating an example of a system configuration of an imaging system to which a technology according to the present disclosure is applied.

FIG. 1 is a block diagram illustrating an example of a system configuration of an imaging system to which the technology according to the present disclosure is applied.

As illustrated in FIG. 1, an imaging system 10 to which the technology according to the present disclosure is applied includes an imaging lens 11, an imaging device 20, a recording section 12, and a control section 13. The imaging system 10 is an example of electronic equipment of the present disclosure, and the examples of the electronic equipment include a camera system installed on an industrial robot, an in-vehicle camera system, and the like.

In the imaging system 10 having the above-described configuration, the imaging lens 11 receives incoming light from a subject and forms an image on an imaging surface of the imaging device 20. The imaging device 20 photoelectrically converts the incoming light received by the imaging lens 11 into imaging data for each pixel. As the imaging device 20, an imaging device of the present disclosure to be described later is used.

The imaging device 20 performs predetermined signal processing such as image recognition processing on captured image data, and outputs, to the recording section 12, data indicating a result of the processing and an address event detection signal to be described later (hereinafter, may be simply described as "detection signal"). A method of generating the address event detection signal will be described later. The recording section 12 stores data supplied from the imaging device 20 over a signal line 14. The control section 13 includes, for example, a microcomputer, and controls imaging operation of the imaging device 20.

[Imaging Device According to First Configuration Example (Arbiter Type)]

Figure 2:
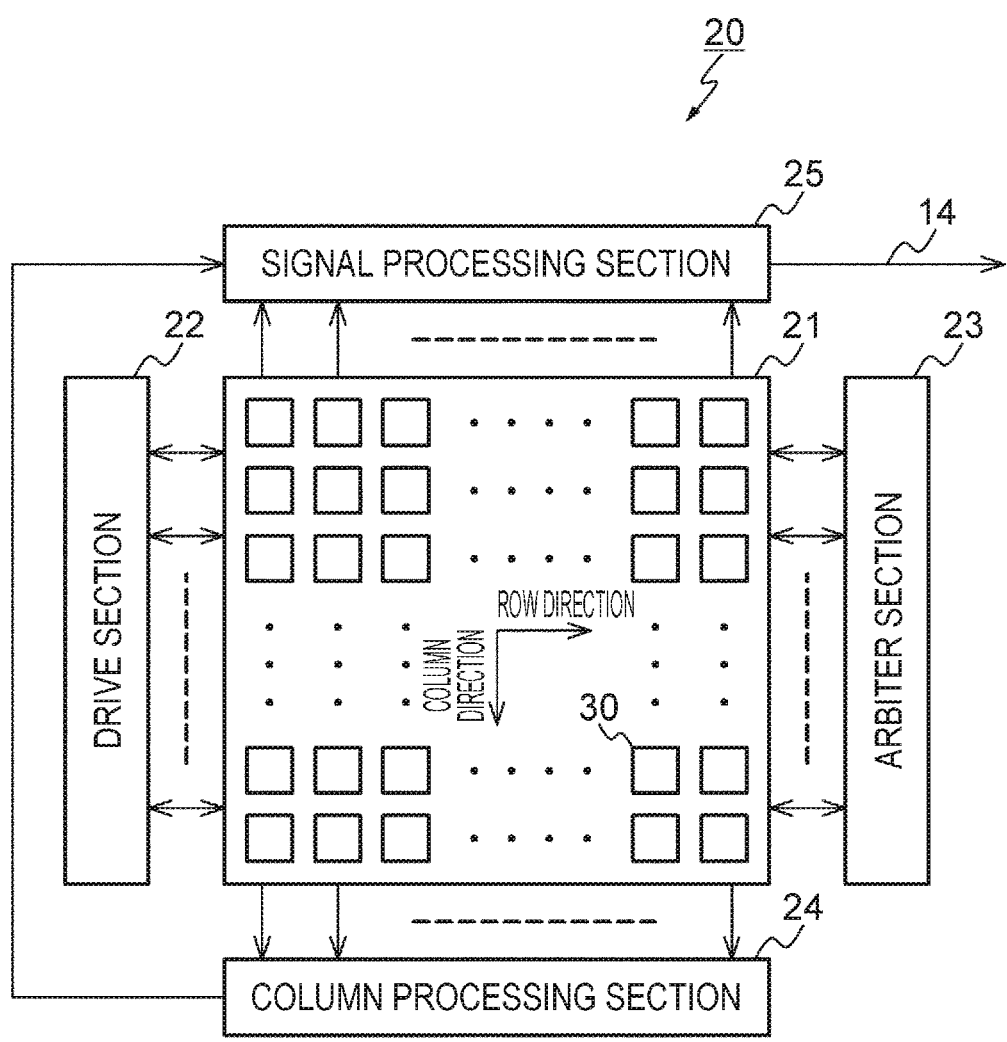
FIG. 2 is a block diagram illustrating an example of a configuration of an imaging device according to a first configuration example of the present disclosure.

FIG. 2 is a block diagram illustrating an example of a configuration of an imaging device according to a first configuration example used as the imaging device 20 in the imaging system 10 to which the technology according to the present disclosure is applied.

As illustrated in FIG. 2, the imaging device 20 according to the first configuration example as the imaging device of the present disclosure is an asynchronous imaging device called a DVS, and includes a pixel array section 21, a drive section 22, an arbiter section (arbitration section) 23, a column processing section 24, and a signal processing section 25.

In the imaging device 20 having the above-described configuration, a plurality of pixels 30 is two-dimensionally arranged in a matrix (array) in the pixel array section 21. A vertical signal line VSL to be described later is laid for each pixel column of this matrix-like pixel array.

Each of the plurality of pixels 30 generates a voltage analog signal corresponding to a photocurrent as a pixel signal. Furthermore, each of the plurality of pixels 30 detects the presence or absence of an address event on the basis of whether or not an amount of change in the photocurrent exceeds a predetermined threshold. Then, when an address event occurs, a corresponding pixel 30 outputs a request to the arbiter section 23.

The drive section 22 drives each of the plurality of pixels 30 to output the pixel signal generated by each pixel 30 to the column processing section 24.

The arbiter section 23 performs arbitration on the respective requests from the plurality of pixels 30 and transmits a response based on the arbitration result to a corresponding pixel 30. The pixel 30 that has received the response from the arbiter section 23 supplies the detection signal (address event detection signal) indicating the detection result to the drive section 22 and the signal processing section 25. It is possible to read the detection signals from the pixels 30 in a plurality of rows.

The column processing section 24 includes, for example, an analog-to-digital converter, and performs processing of converting, for each pixel column of the pixel array section 21, the analog pixel signal output from the pixel 30 in the column into a digital signal. Then, the column processing section 24 supplies the digital signal obtained by the analog-digital conversion to the signal processing section 25.

The signal processing section 25 performs predetermined signal processing such as correlated double sampling (CDS) processing or image recognition processing on the digital signal supplied from the column processing section 24. Then, the signal processing section 25 supplies data indicating the processing result and the detection signal supplied from the arbiter section 23 to the recording section 12 (see FIG. 1) over the signal line 14.

[Configuration Example of Pixel Array Section]

Figure 3:
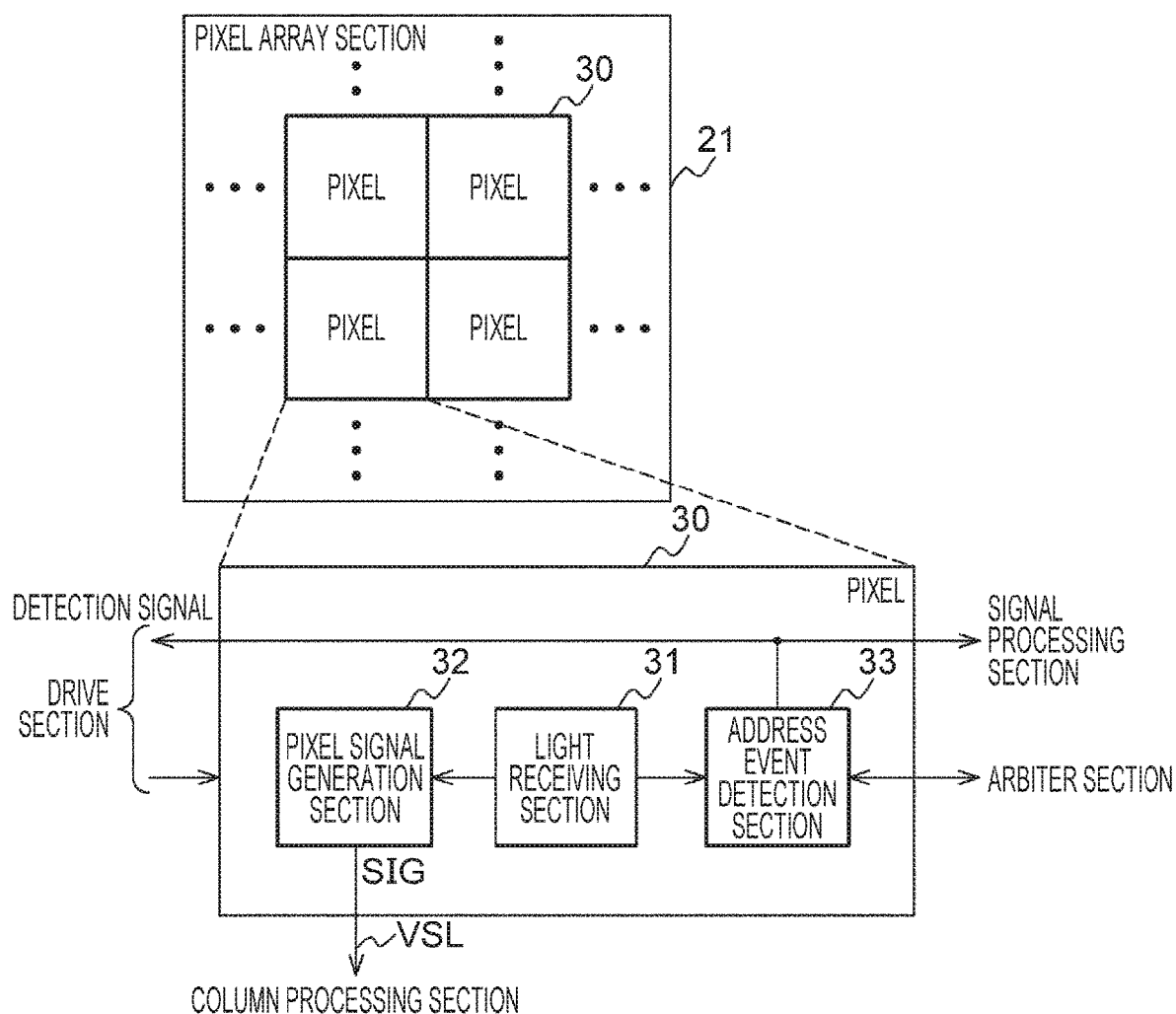
FIG. 3 is a block diagram illustrating an example of a configuration of a pixel array section.

FIG. 3 is a block diagram illustrating an example of a configuration of the pixel array section 21.

In the pixel array section 21 in which the plurality of pixels 30 is two-dimensionally arranged in a matrix, each of the plurality of pixels 30 includes a light receiving section 31, a pixel signal generation section 32, and an address event detection section 33.

In each pixel 30 having the above-described configuration, the light receiving section 31 photoelectrically converts incoming light into a photocurrent. Then, the light receiving section 31 supplies the photocurrent generated as a result of photoelectric conversion to either the pixel signal generation section 32 or the address event detection section 33 under the control of the drive section 22 (see FIG. 2).

The pixel signal generation section 32 generates a voltage signal corresponding to the photocurrent supplied from the light receiving section 31 as a pixel signal SIG, and supplies the generated pixel signal SIG to the column processing section 24 (see FIG. 2) over the vertical signal line VSL.

The address event detection section 33 detects the presence or absence of an address event on the basis of whether or not the amount of change in the photocurrent from each light receiving section 31 exceeds the predetermined threshold value. The address event includes, for example, an ON event indicating that the amount of change in the photocurrent exceeds an upper limit threshold and an OFF event indicating that the amount of change falls below a lower limit threshold. Furthermore, the address event detection signal includes, for example, one bit indicating a detection result of the ON event and one bit indicating a detection result of the OFF event. Note that the address event detection section 33 may be configured to detect only the ON event.

When an address event occurs, the address event detection section 33 supplies, to the arbiter section 23, a request to transmit the address event detection signal (see FIG. 2). Then, upon receipt of a response to the request from the arbiter section 23, the address event detection section 33 supplies the address event detection signal to the drive section 22 and the signal processing section 25.

[Example of Circuit Configuration of Pixel]

Figure 4:
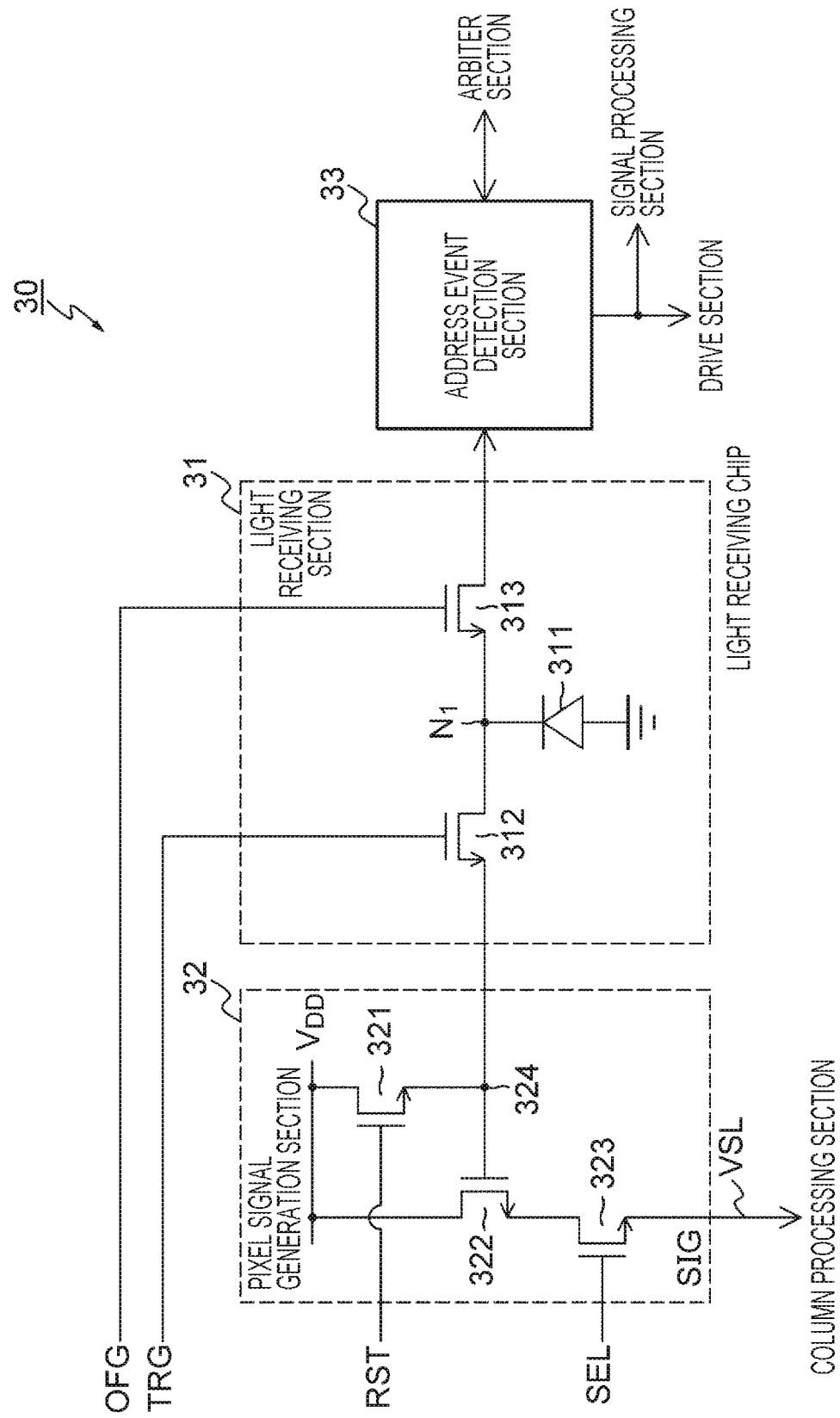
FIG. 4 is a circuit diagram illustrating an example of a circuit configuration of a pixel.

FIG. 4 is a circuit diagram illustrating an example of a circuit configuration of the pixel 30. As described above, each of the plurality of pixels 30 includes the light receiving section 31, the pixel signal generation section 32, and the address event detection section 33.

In the pixel 30 having the above-described configuration, the light receiving section 31 includes a light receiving element (photoelectric conversion element) 311, a transfer transistor 312, and an over flow gate (OFG) transistor 313. As the transfer transistor 312 and the OFG transistor 313, for example, N-type metal oxide semiconductor (MOS) transistors are used. The transfer transistor 312 and the OFG transistor 313 are connected in series to each other.

The light receiving element 311 is connected between a common connection node $N_1$ of the transfer transistor 312 and the OFG transistor 313 and the ground, and photoelectrically converts incoming light into a charge having a charge amount corresponding to intensity of the incoming light.

A transfer signal TRG is supplied from the drive section 22 illustrated in FIG. 2 to a gate electrode of the transfer transistor 312. In response to the transfer signal TRG, the transfer transistor 312 supplies, to the pixel signal generation section 32, the charge obtained as a result of the photoelectric conversion performed by the light receiving element 311.

A control signal OFG is supplied from the drive section 22 to a gate electrode of the OFG transistor 313. In response to the control signal OFG, the OFG transistor 313 supplies, to the address event detection section 33, an electrical signal generated by the light receiving element 311. The electrical signal supplied to the address event detection section 33 is a photocurrent including the charge.

The pixel signal generation section 32 includes a reset transistor 321, an amplification transistor 322, a selection transistor 323, and a floating diffusion layer 324. As the reset transistor 321, the amplification transistor 322, and the selection transistor 323, for example, N-type MOS transistors are used.

The charge obtained as a result of the photoelectric conversion performed by the light receiving element 311 is supplied from the light receiving section 31 to the pixel signal generation section 32 by the transfer transistor 312. The charge supplied from the light receiving section 31 is accumulated in the floating diffusion layer 324. The floating diffusion layer 324 generates a voltage signal having a voltage value corresponding to an amount of the accumulated charge. That is, the floating diffusion layer 324 converts a charge into a voltage.

The reset transistor 321 is connected between a power line of a power supply voltage $V_{DD}$ and the floating diffusion layer 324. A reset signal RST is supplied from the drive section 22 to a gate electrode of the reset transistor 321. The reset transistor 321 initializes (resets) the charge amount in the floating diffusion layer 324 in response to the reset signal RST.

The amplification transistor 322 is connected in series to the selection transistor 323 between the power line of the power supply voltage $V_{DD}$ and the vertical signal line VSL. The amplification transistor 322 amplifies the voltage signal obtained as a result of the charge-voltage conversion performed by the floating diffusion layer 324.

A selection signal SEL is supplied from the drive section 22 to a gate electrode of the selection transistor 323. In response to the selection signal SEL, the selection transistor 323 outputs, as the pixel signal SIG, the voltage signal amplified by the amplification transistor 322 to the column processing section 24 (see FIG. 2) over the vertical signal line VSL.

In the imaging device 20 including the pixel array section 21 in which the pixels 30 having the above-described configuration are two-dimensionally arranged, in response to an instruction to start address event detection issued by the control section 13 illustrated in FIG. 1, the drive section 22 supplies the control signal OFG to the OFG transistor 313 of the light receiving section 31 to drive the OFG transistor 313, so as to supply the photocurrent to the address event detection section 33.

Then, when an address event is detected in a certain pixel 30, the drive section 22 brings the OFG transistor 313 of the pixel 30 into an OFF state to stop the supply of the photocurrent to the address event detection section 33. Next, the drive section 22 supplies the transfer signal TRG to the transfer transistor 312 to drive the transfer transistor 312, so as to transfer, to the floating diffusion layer 324, the charge obtained as a result of the photoelectric conversion performed by the light receiving element 311.

As described above, the imaging device 20 including the pixel array section 21 in which the pixels 30 having the above-described configuration are two-dimensionally arranged outputs only the pixel signal of a pixel 30 in which an address event has been detected to the column processing section 24. It is therefore possible to reduce the power consumption of the imaging device 20 or processing load of the image processing as compared with a case where the pixel signals of all the pixels are output regardless of the presence or absence of an address event.

Note that the configuration of the pixel 30 illustrated here is an example, and is not limited to this configuration example. For example, a pixel configuration without the pixel signal generation section 32 may be employed. Such a pixel configuration eliminates the need of the OFG transistor 313 in the light receiving section 31, and only requires that the transfer transistor 312 have the function of the OFG transistor 313.

[First Configuration Example of Address Event Detection Section]

Figure 5:
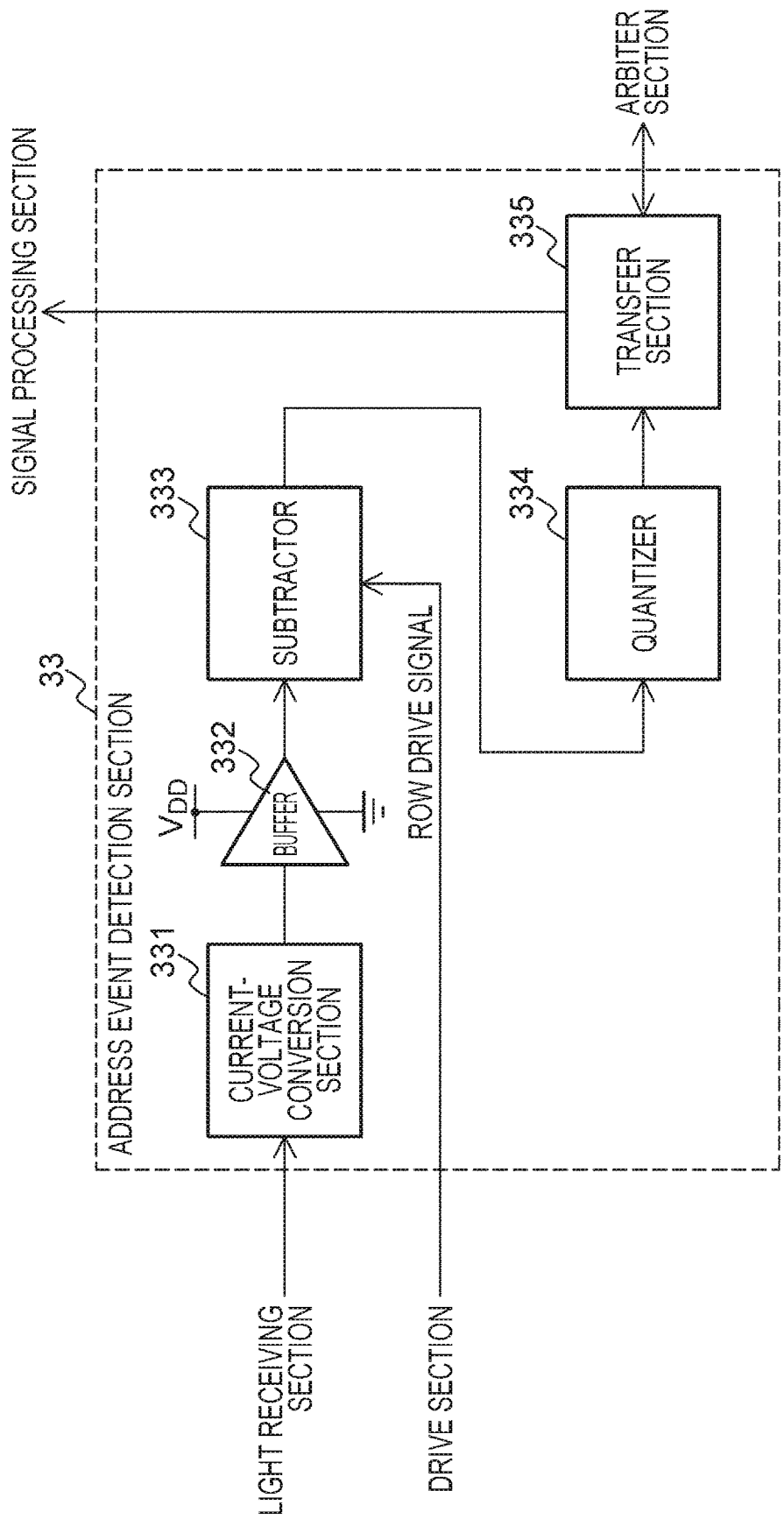
FIG. 5 is a block diagram illustrating a first configuration example of an address event detection section.

FIG. 5 is a block diagram illustrating a first configuration example of the address event detection section 33. As illustrated in FIG. 5, the address event detection section 33 according to the present configuration example includes a current-voltage conversion section 331, a buffer 332, a subtractor 333, a quantizer 334, and a transfer section 335.

The current-voltage conversion section 331 converts the photocurrent from the light receiving section 31 of each pixel 30 into a voltage signal corresponding to a logarithm of the photocurrent. The current-voltage conversion section 331 supplies the voltage signal obtained as a result of the conversion to the buffer 332. The buffer 332 buffers the voltage signal supplied from the current-voltage conversion section 331 and supplies the voltage signal to the subtractor 333.

A row drive signal is supplied from the drive section 22 to the subtractor 333. The subtractor 333 lowers a level of the voltage signal supplied from the buffer 332 in accordance with the row drive signal. Then, the subtractor 333 supplies the voltage signal whose level has been lowered to the quantizer 334. The quantizer 334 quantizes the voltage signal supplied from the subtractor 333 into a digital signal and outputs the digital signal to the transfer section 335 as the address event detection signal.

The transfer section 335 transfers, to the arbiter section 23 or the like, the address event detection signal supplied from the quantizer 334. When an address event has been detected, the transfer section 335 supplies, to the arbiter section 23, a request to transmit the address event detection signal. Then, upon receipt of a response to the request from the arbiter section 23, the transfer section 335 supplies the address event detection signal to the drive section 22 and the signal processing section 25.

Next, configuration examples of the current-voltage conversion section 331, the subtractor 333, and the quantizer 334 in the address event detection section 33 will be described.

(Configuration Example of Current-Voltage Conversion Section)

Figure 6:
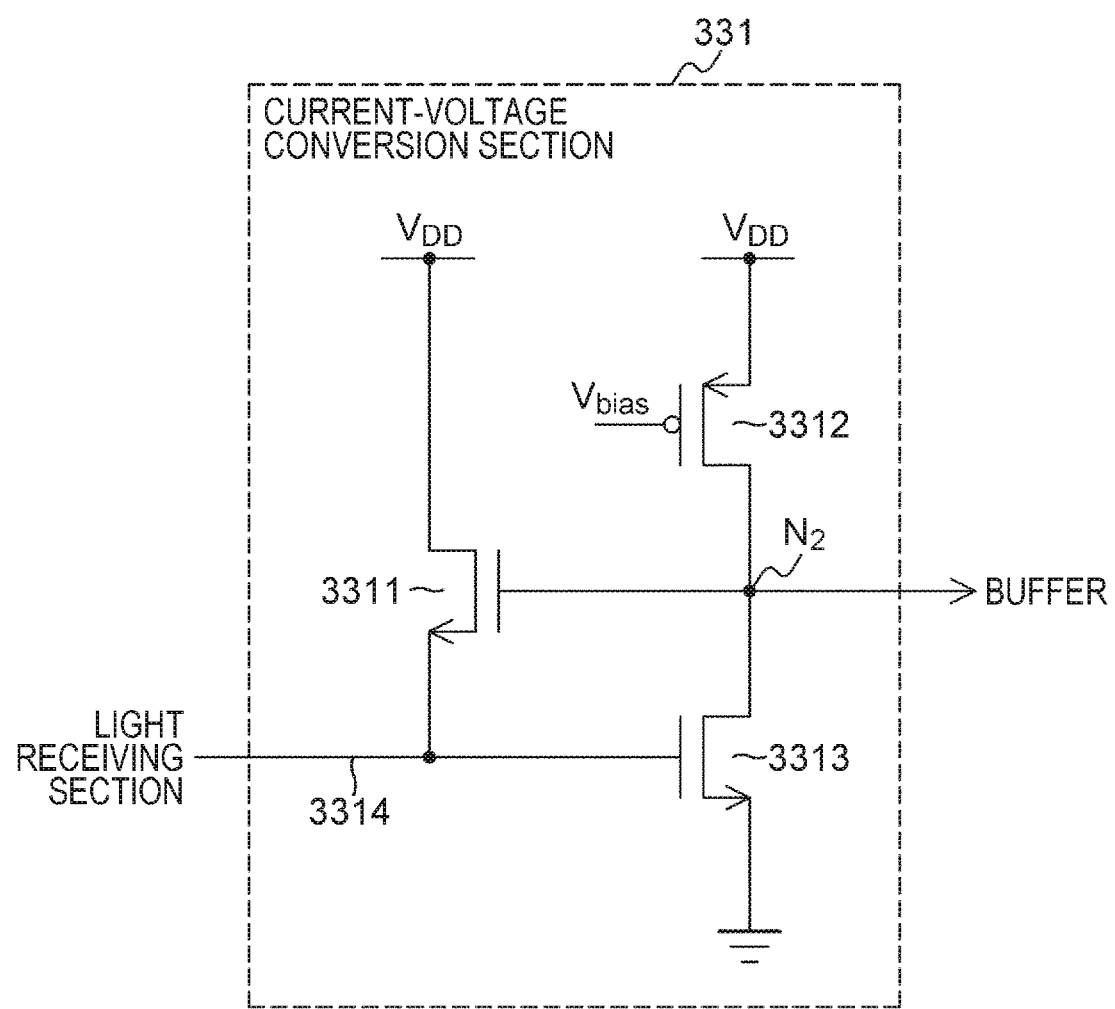
FIG. 6 is a circuit diagram illustrating an example of a configuration of a current-voltage conversion section in the address event detection section.

FIG. 6 is a circuit diagram illustrating an example of a configuration of the current-voltage conversion section 331 in the address event detection section 33. As illustrated in FIG. 6, the current-voltage conversion section 331 according to the present example has a circuit configuration including an N-type transistor 3311, a P-type transistor 3312, and an N-type transistor 3313. As such transistors 3311 to 3313, for example, MOS transistors are used.

The N-type transistor 3311 is connected between the power line of the power supply voltage $V_{DD}$ and a signal input line 3314. The P-type transistor 3312 and the N-type transistor 3313 are connected in series between the power line of the power supply voltage $V_{DD}$ and the ground. Then, a gate electrode of the N-type transistor 3311 and an input terminal of the buffer 332 illustrated in FIG. 5 are connected to a common connection node $N_2$ of the P-type transistor 3312 and the N-type transistor 3313.

A predetermined bias voltage $V_{bias}$ is applied to a gate electrode of the P-type transistor 3312. Thus, the P-type transistor 3312 may supply a constant current to the N-type transistor 3313. The photocurrent is input from the light receiving section 31 to a gate electrode of the N-type transistor 3313 over the signal input line 3314.

Drain electrodes of the N-type transistor 3311 and the N-type transistor 3313 are connected to the power supply side, and such a circuit is called a source follower. The two source followers connected in a loop convert the photocurrent from the light receiving section 31 into a voltage signal corresponding to a logarithm of the photocurrent.

(Configuration Example of Subtractor and Quantizer)

Figure 7:
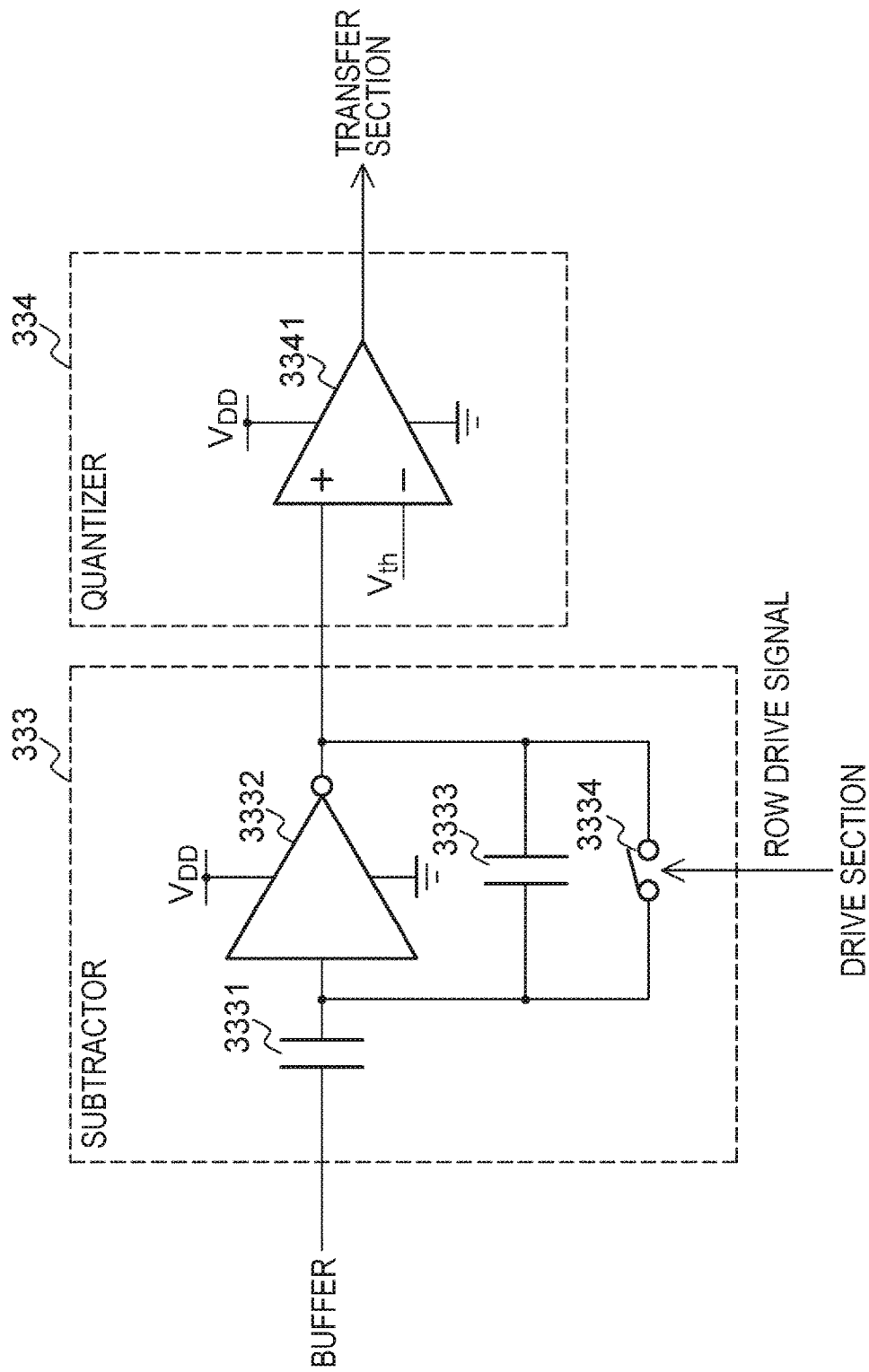
FIG. 7 is a circuit diagram illustrating examples of configurations of a subtractor and a quantizer in the address event detection section.

FIG. 7 is a circuit diagram illustrating examples of configurations of the subtractor 333 and the quantizer 334 in the address event detection section 33.

The subtractor 333 according to the present example includes a capacitive element 3331, an inverter circuit 3332, a capacitive element 3333, and a switch element 3334.

The capacitive element 3331 has one end connected to an output terminal of the buffer 332 illustrated in FIG. 5, and has the other end connected to an input terminal of the inverter circuit 3332. The capacitive element 3333 is connected in parallel to the inverter circuit 3332. The switch element 3334 is connected across the capacitive element 3333. The row drive signal is supplied from the drive section 22 to the switch element 3334 as an open/close control signal for the switch element 3334. The switch element 3334 opens or closes a path connecting across the capacitive element 3333 in response to the row drive signal. The inverter circuit 3332 inverts a polarity of the voltage signal input via the capacitive element 3331.

In the subtractor 333 having the above-described configuration, when the switch element 3334 is brought into an ON (closed) state, a voltage signal $V_{init}$ is input to a terminal of the capacitive element 3331 adjacent to the buffer 332, and a terminal of the capacitive element 3331 remote from the buffer 332 serves as a virtual ground terminal. The potential of the virtual ground terminal is zero for convenience sake. At this time, with a capacitance value of the capacitive element 3331 denoted as $C_1$, a charge $Q_{init}$ accumulated in the capacitive element 3331 is expressed by the following equation (1). On the other hand, both the ends of the capacitive element 3333 are short-circuited, so that the accumulated charge becomes zero.

$$Q_{init}=C_1*V_{init} \qquad (1)$$

Next, in a case where the switch element 3334 is brought into the OFF (open) state, and a voltage at the terminal of the capacitive element 3331 adjacent to the buffer 332 changes to $V_{after}$, a charge $Q_{after}$ accumulated in the capacitive element 3331 is expressed by the following equation (2).

$$Q_{after}=C_1*V_{after} \qquad (2)$$

On the other hand, with a capacitance value of the capacitive element 3333 denoted as $C_2$ and an output voltage denoted as $V_{out}$, a charge $Q_2$ accumulated in the capacitive element 3333 is expressed by the following equation (3).

$$Q_2=-C_2*V_{out} \qquad (3)$$

At this time, a total charge amount of the capacitive element 3331 and the capacitive element 3333 does not change, so that the following equation (4) is satisfied.

$$Q_{init}=Q_{after}+Q_2 \qquad (4)$$

When the equations (1) to (3) are substituted into the equation (4) for conversion, the following equation (5) is obtained.

$$V_{out}=-(C_1/C_2)*(V_{after}-V_{init}) \qquad (5)$$

The equation (5) represents a subtraction operation of the voltage signal, and the gain of the subtraction result is $C_1/C_2$. It is usually desired to maximize the gain, so that it is preferable that $C_1$ be designed be large and $C_2$ be designed to be small. On the other hand, if $C_2$ is too small, kTC noise may increase, and noise characteristics may deteriorate, so that a reduction in capacitance $C_2$ is limited to a range in which noise can be tolerated. Furthermore, since the address event detection section 33 including the subtractor 333 is installed for each pixel 30, the capacitive element 3331 and the capacitive element 3333 have area restrictions. Taking the above-described points into account, the capacitance values $C_1$, $C_2$ of the capacitive elements 3331, 3333 are determined.

In FIG. 7, the quantizer 334 includes a comparator 3341. The comparator 3341 takes an output signal of the inverter circuit 3332, that is, the voltage signal from the subtractor 430, as non-inverting (+) input, and takes a predetermined threshold voltage $V_{th}$ as inverting (−) input. Then, the comparator 3341 compares the voltage signal from the subtractor 430 with the predetermined threshold voltage $V_{th}$, and outputs a signal indicating the comparison result to the transfer section 335 as the address event detection signal.

[Second Configuration Example of Address Event Detection Section]

Figure 8:
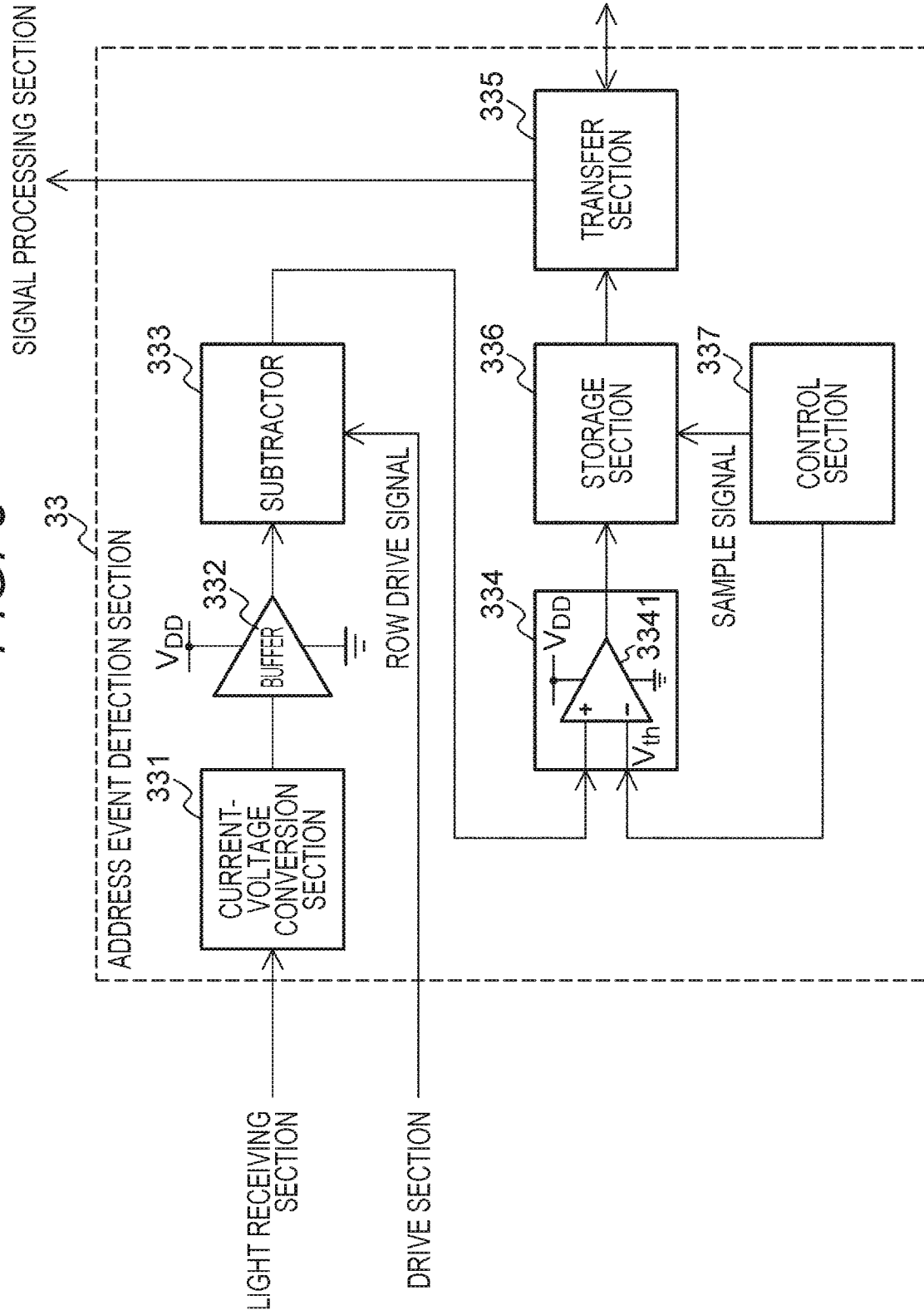
FIG. 8 is a block diagram illustrating a second configuration example of the address event detection section.

FIG. 8 is a block diagram illustrating a second configuration example of the address event detection section 33. As illustrated in FIG. 8, the address event detection section 33 according to the present configuration example includes a storage section 336 and a control section 337 in addition to the current-voltage conversion section 331, the buffer 332, the subtractor 333, the quantizer 334, and the transfer section 335.

The storage section 336 is provided between the quantizer 334 and the transfer section 335, and accumulates the output of the quantizer 334, that is, the comparison result of the comparator 3341, on the basis of a sample signal supplied from the control section 337. The storage section 336 may be a sampling circuit such as a switch, plastic, or a capacitor, or may be a digital memory circuit such as a latch or a flip-flop.

The control section 337 supplies the predetermined threshold voltage $V_{th}$ to the inverting (−) input terminal of the comparator 3341. The threshold voltage $V_{th}$ supplied from the control section 337 to the comparator 3341 may have a voltage value varying in a time-division manner. For example, the control section 337 supplies a threshold voltage $V_{th1}$ corresponding to the ON event indicating that the amount of change in the photocurrent exceeds the upper limit threshold and a threshold voltage $V_{th2}$ corresponding to the OFF event indicating that the amount of change falls below the lower limit threshold at different timings, so that one comparator 3341 can detect a plurality of types of address events.

For example, the storage section 336 may accumulate the comparison results of the comparator 3341 using the threshold voltage $V_{th1}$ corresponding to the ON event during a period where the threshold voltage $V_{th2}$ corresponding to the OFF event is supplied from the control section 337 to the inverting (−) input terminal of the comparator 3341. Note that the storage section 336 may be installed inside the pixel 30 or may be installed outside the pixel 30. Furthermore, the storage section 336 is not an essential component of the address event detection section 33. That is, the storage section 336 may be omitted.

[Imaging Device According to Second Configuration Example (Scanning Type)]

The imaging device 20 according to the first configuration example described above is an asynchronous imaging device that reads an event in an asynchronous read mode. Note that the event read mode is not limited to such the asynchronous read mode, and may be a synchronous read mode. An imaging device to which the synchronous read mode is applied is an imaging device of a scanning type, which is the same as a typical imaging device that captures images at a predetermined frame rate.

Figure 9:
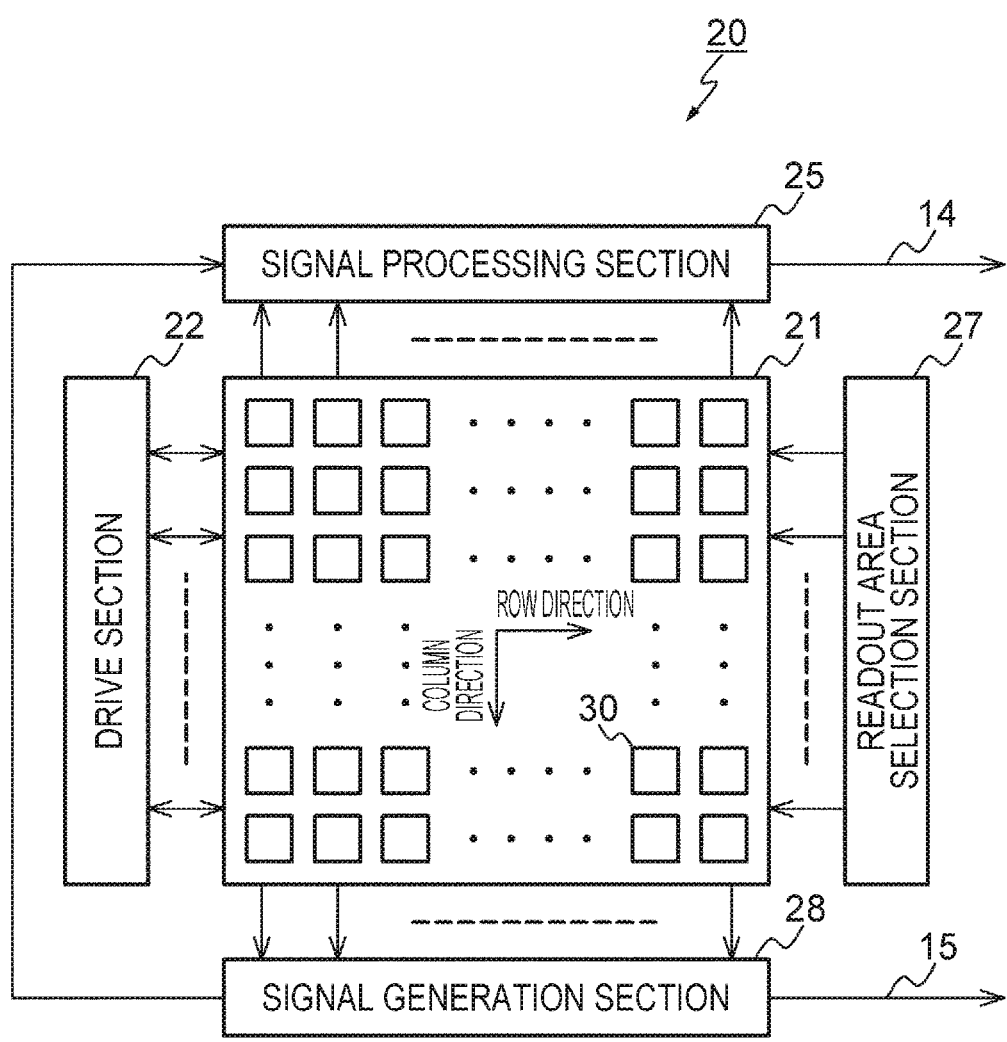
FIG. 9 is a block diagram illustrating an example of a configuration of an imaging device according to a second configuration example of the present disclosure.

FIG. 9 is a block diagram illustrating an example of a configuration of an imaging device according to the second configuration example, that is, an imaging device of a scanning type, used as the imaging device 20 in the imaging system 10 to which the technology according to the present disclosure is applied.

As illustrated in FIG. 9, the imaging device 20 according to the second configuration example as the imaging device of the present disclosure includes a pixel array section 21, a drive section 22, a signal processing section 25, a readout area selection section 27, and a signal generation section 28.

The pixel array section 21 includes a plurality of pixels 30. The plurality of pixels 30 outputs an output signal in response to a selection signal of the readout area selection section 27. Each of the plurality of pixels 30 may include a quantizer as illustrated in FIG. 7, for example. The plurality of pixels 30 outputs an output signal corresponding to an amount of change in intensity of light. The plurality of pixels 30 may be two-dimensionally arranged in a matrix as illustrated in FIG. 9.

The drive section 22 drives each of the plurality of pixels 30 to output a pixel signal generated by each pixel 30 to the signal processing section 25. Note that the drive section 22 and the signal processing section 25 are circuit sections configured to acquire grayscale information. Therefore, in a case where only event information is acquired, the drive section 22 and the signal processing section 25 may be omitted.

The readout area selection section 27 selects some of the plurality of pixels 30 included in the pixel array section 21. For example, the readout area selection section 27 selects any one or some of the rows included in the structure of the two-dimensional matrix corresponding to the pixel array section 21. The readout area selection section 27 sequentially selects one or some of the rows at preset intervals. Furthermore, the readout area selection section 27 may determine an area to be selected in response to a request from each pixel 30 of the pixel array section 21.

The signal generation section 28 generates, on the basis of the output signals of pixels selected by the readout area selection section 27, an event signal corresponding to an active pixel in which an event has been detected among the selected pixels. The event is an event indicating a change in intensity of light. The active pixel is a pixel in which the amount of change in intensity of light corresponding to the output signal exceeds or falls below a preset threshold. For example, the signal generation section 28 compares the output signal of each pixel with a reference signal, detects, in a case where the output signal is greater or smaller than the reference signal, an active pixel that outputs the output signal, and generates an event signal corresponding to the active pixel.

The signal generation section 28 can include, for example, a column selection circuit configured to perform arbitration on the signals entering the signal generation section 28. Furthermore, the signal generation section 28 may be configured to output not only information of the active pixel in which an event has been detected but also information of an inactive pixel in which no event has been detected.

Address information and time stamp information (for example, (X, Y, T)) of the active pixel in which an event has been detected are output from the signal generation section 28 over an output line 15. Note that data output from the signal generation section 28 is not limited to the address information and the time stamp information, and may be information in a frame form (for example, (0, 0, 1, 0, . . . )).

[Configuration Example of Chip Structure]

Figure 10:
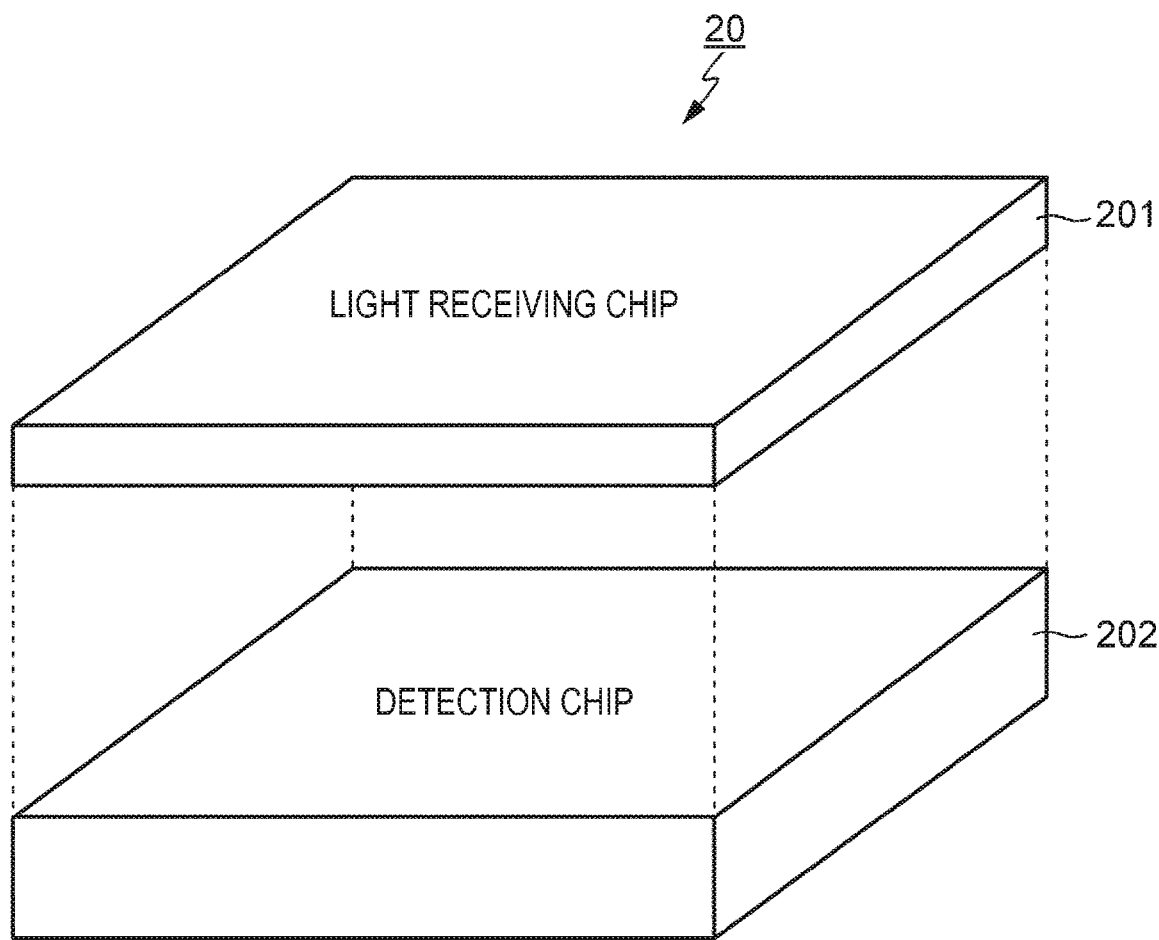
FIG. 10 is an exploded perspective view schematically illustrating a multilayer chip structure of the imaging device.

As a chip (semiconductor integrated circuit) structure of the imaging device 20 according to the first configuration example or the second configuration example described above, a multilayer chip structure may be employed, for example. FIG. 10 is an exploded perspective view schematically illustrating a multilayer chip structure of the imaging device 20.

As illustrated in FIG. 10, the multilayer chip structure, that is, a multilayer structure, corresponds to a structure in which at least two chips of a light receiving chip 201 serving as a first chip and a detection chip 202 serving as a second chip are laminated. Then, with the circuit configuration of the pixel 30 illustrated in FIG. 4, each light receiving element 311 is arranged on the light receiving chip 201, and all elements other than the light receiving element 311, elements of the other circuit portion of the pixel 30, and the like are arranged on the detection chip 202. The light receiving chip 201 and the detection chip 202 are electrically connected via a connection portion such as a via, Cu—Cu bonding, or a bump.

Note that a configuration example where each light receiving elements 311 is arranged on the light receiving chip 201, and the elements other than the light receiving element 311, the elements of the other circuit portion of the pixel 30, and the like are arranged on the detection chip 202 has been described above, but the configuration is not limited to this configuration example.

For example, with the circuit configuration of the pixel 30 illustrated in FIG. 4, each element of the light receiving section 31 may be arranged on the light receiving chip 201, and elements other than the light receiving section 31, elements of the other circuit portion of the pixel 30, and the like may be arranged on the detection chip 202. Furthermore, each element of the light receiving section 31, and the reset transistor 321 and the floating diffusion layer 324 of the pixel signal generation section 32 may be arranged on the light receiving chip 201, and the other elements may be arranged on the detection chip 202. Furthermore, some of the elements constituting the address event detection section 33 may be arranged on the light receiving chip 201 together with each element of the light receiving section 31 and the like.

[Configuration Example of Column Processing Section]

Figure 11:
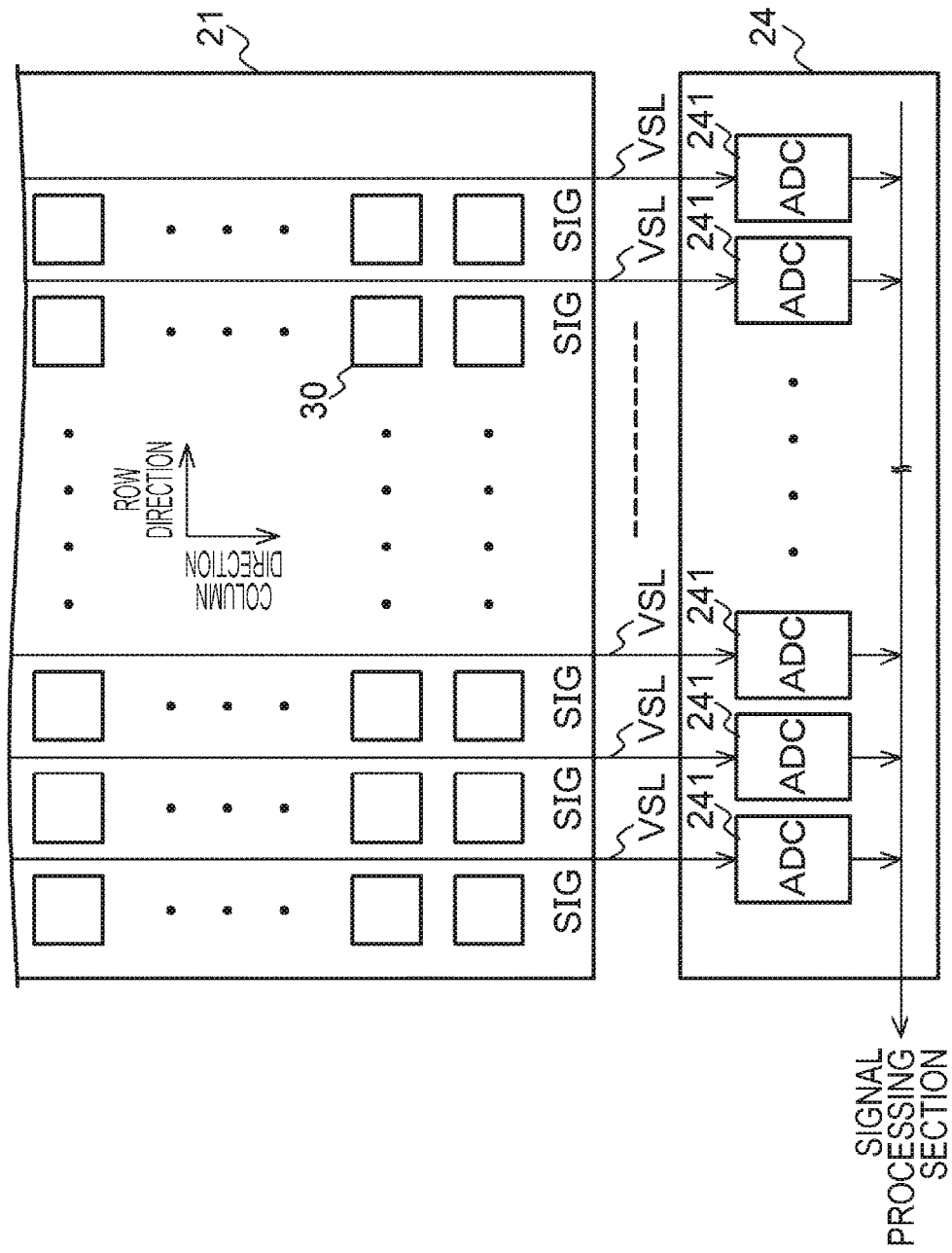
FIG. 11 is a block diagram illustrating an example of a configuration of a column processing section of the imaging device according to the first configuration example.

FIG. 11 is a block diagram illustrating an example of a configuration of the column processing section 24 of the imaging device 20 according to the first configuration example. As illustrated in FIG. 11, the column processing section 24 according to the present example includes a plurality of analog-digital converters (ADC) 241 each arranged for a corresponding pixel column of the pixel array section 21.

Note that a configuration example where the analog-digital converters 241 are arranged in a one-to-one relationship with the pixel columns of the pixel array section 21 has been described above, but the configuration is not limited to this configuration example. For example, the analog-digital converters 241 may be each arranged for a plurality of pixel columns, and the analog-digital converter 241 may be configured to be time-shared among the plurality of pixel columns.

Each analog-digital converter 241 converts the analog pixel signal SIG supplied over the vertical signal line VSL into a digital signal longer in bit length than the address event detection signal described above. For example, in a case where the address event detection signal has a length of two bits, the pixel signal is converted into a digital signal having a length of three bits or more (16 bits or the like). The analog-digital converter 241 supplies the digital signal generated as a result of the analog-digital conversion to the signal processing section 25.

[About Noise Event]

Meanwhile, the imaging device 20 according to the first configuration example is an asynchronous imaging device called a DVS, including, for each pixel 30, a detection section (that is, the address event detection section 33) that detects, for each pixel address, that light intensity at a corresponding pixel exceeds a predetermined threshold as an address event in real time.

In general, in such an asynchronous imaging device according to the first configuration example, when some event (that is, a true event) occurs in a scene, data that causes the true event is acquired. In the asynchronous imaging device, however, even in a scene where no true event occurs, data may be wastefully acquired due to a noise event (false event) such as sensor noise. Thus, not only a noise signal is read, but also the throughput of the signal output is reduced. The imaging device 20 of the present disclosure described below is configured not to acquire a noise event.

Figure 12:
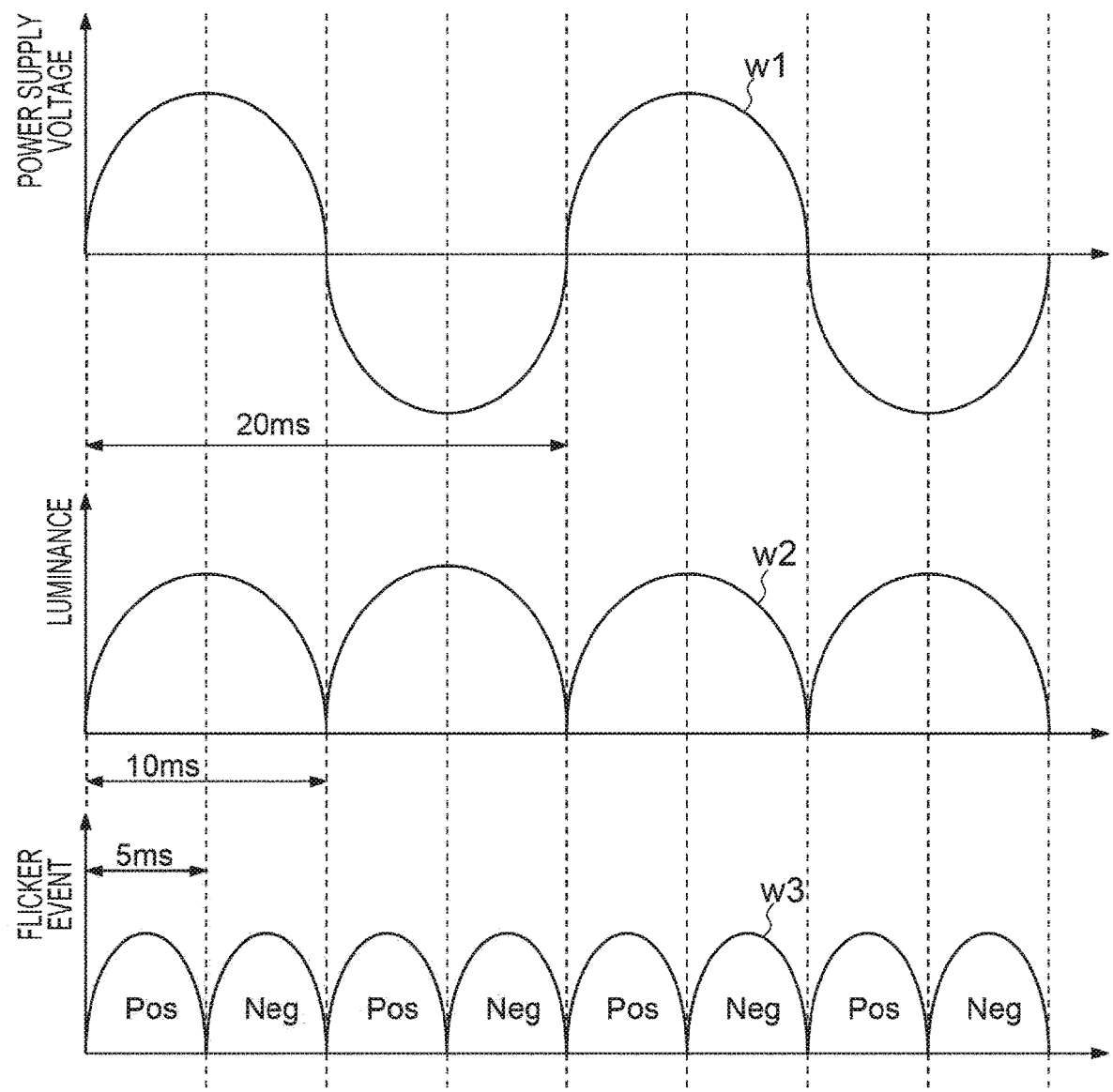
FIG. 12 is a diagram for describing the reason why a flicker occurs.

A representative example of the noise event is a flicker of an electrical appliance such as a fluorescent lamp or an LED. FIG. 12 is a diagram for describing the reason why a flicker occurs. FIG. 12 is a diagram illustrating a waveform w1 of a commercial power supply voltage, a waveform w2 of luminance variations of an electrical appliance, and a waveform w3 of an event detection signal caused by a flicker. The commercial power supply voltage is, for example, an AC voltage having a frequency of 50 Hz, and one period is 20 ms. In the electrical appliance driven with the commercial power supply voltage, the luminance varies every half period of the commercial power supply voltage as indicated by the waveform w2. The address event detection section 33 described above causes a Positive event (hereinafter, referred to as Pos event) to occur when an absolute value of an amount of upward luminance change exceeds a first threshold, and causes Negative (hereinafter, referred to as Neg event) to occur when an absolute value of an amount of downward luminance change exceeds a second threshold. Therefore, as indicated by the waveform w3, the Pos event and the Neg event alternately occur every half of the period of the luminance variations.

Since the Pos event and the Neg event caused by a flicker are different from an event originally desired to be detected, the imaging device 20 according to the present embodiment is characterized as preventing an event caused by a flicker from occurring.

Figure 13A:
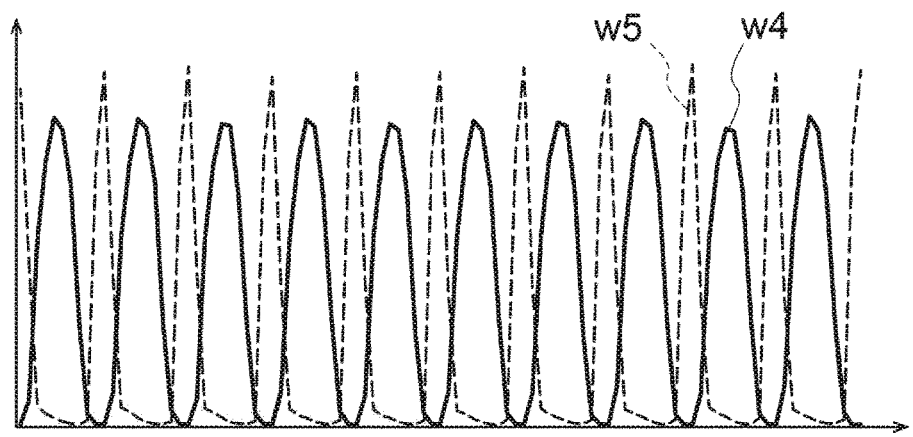
FIG. 13A is a diagram illustrating an event detection waveform of a fire hydrant LED.
Figure 13B:
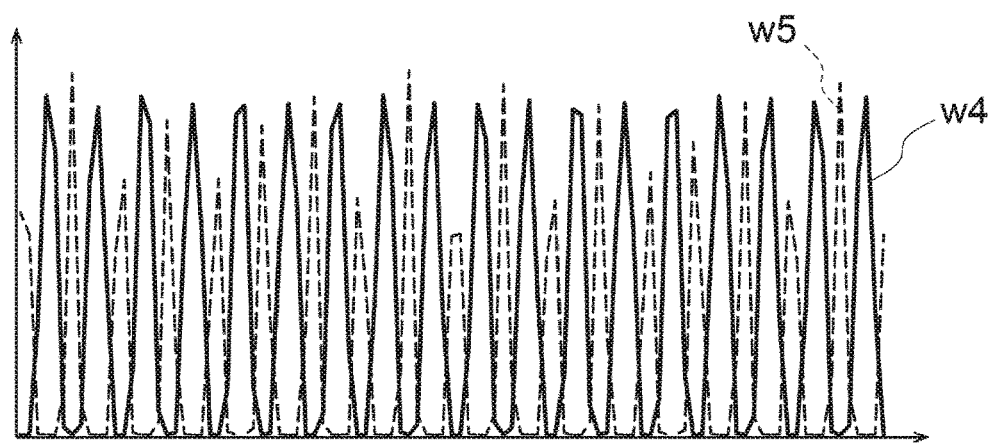
FIG. 13B is a diagram illustrating an event detection waveform of an old display monitor.
Figure 13C:
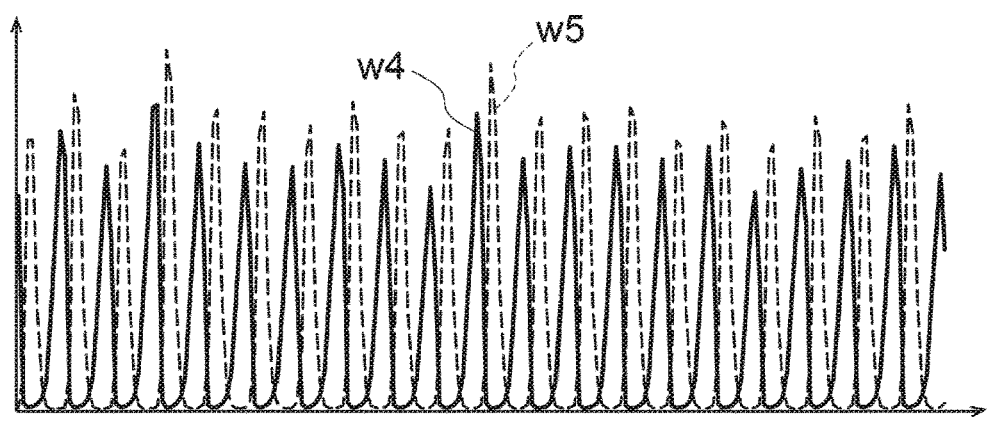
FIG. 13C is a diagram illustrating an event detection waveform of a fluorescent lamp.

FIGS. 13A, 13B, and 13C are diagrams illustrating specific examples of waveforms w4, w5 of the Pos event and the Neg event caused by a flicker occurring in various electrical appliances. FIG. 13A illustrates a Pos event waveform and a Neg event waveform of a fire hydrant LED, FIG. 13B illustrates a Pos event waveform and a Neg event waveform of an old display monitor device, and FIG. 13C illustrates a Pos event waveform and a Neg event waveform of a fluorescent lamp. As illustrated in FIGS. 13A, 13B, and 13C, the number of occurrences of the Pos event and the Neg event and occurrence periods of the Pos event and the Neg event vary in a manner that depends on the type of the electrical appliance. FIGS. 13A, 13B, and 13C each illustrate an example of an event occurrence pattern, and an occurrence pattern of the Pos event and the Neg event may vary in a manner that depends on each individual electrical appliance even when the electrical appliances are of the same type.

Figure 14:
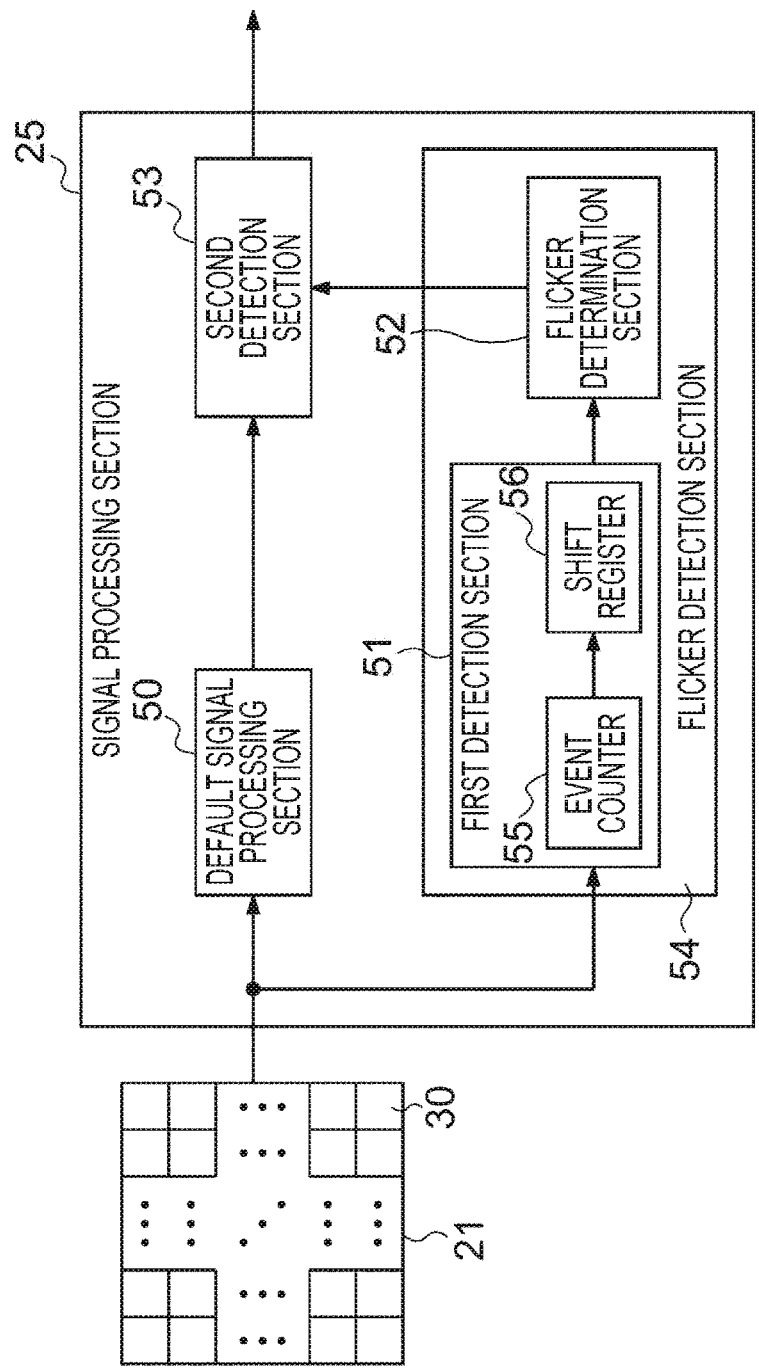
FIG. 14 is a block diagram illustrating an example of an internal configuration of a signal processing section 25.

FIG. 14 is a block diagram illustrating an example of an internal configuration of the signal processing section 25 according to the present embodiment. The signal processing section 25 illustrated in FIG. 14 includes a first detection section 51, a flicker determination section 52, and a second detection section 53 in addition to a block (hereinafter, referred to as default signal processing section 50 for convenience sake) that perform default signal processing. Hereinafter, the first detection section 51 and the flicker determination section 52 are collectively referred to as a flicker detection section 54.

The first detection section 51 detects a detection signal in a case where the absolute value of the amount of change in electrical signals generated by the plurality of photoelectric conversion elements exceeds a predetermined threshold. The first detection section 51 detects an event signal output from the address event detection section 33 as the detection signal.

The first detection section 51 includes, for example, an event counter 55 and a shift register 56. The event counter 55 counts the number of Pos events and the number of Neg events. As described later, a counter that counts the number of Pos events and a counter that counts the number of Neg events may be provided. Alternatively, a counter that counts up each time the Pos event occurs and counts down each time the Neg event occurs may be provided. The shift register 56 holds a count value of the event counter 55. Note that a memory or a register that holds the count value may be provided instead of the shift register 56.

The flicker determination section 52 determines whether or not the detection signal detected by the first detection section 51 includes a detection signal caused by a flicker of the light source. As described later, the flicker determination section 52 determines whether or not the detection signal detected by the first detection section 51 has been caused by a flicker or a factor other than the flicker.

In a case where it is determined that the detection signal caused by a flicker is included, the second detection section 53 detects a detection signal caused by a factor other than the flicker from among the detection signals detected by the first detection section 51.

Figure 15:
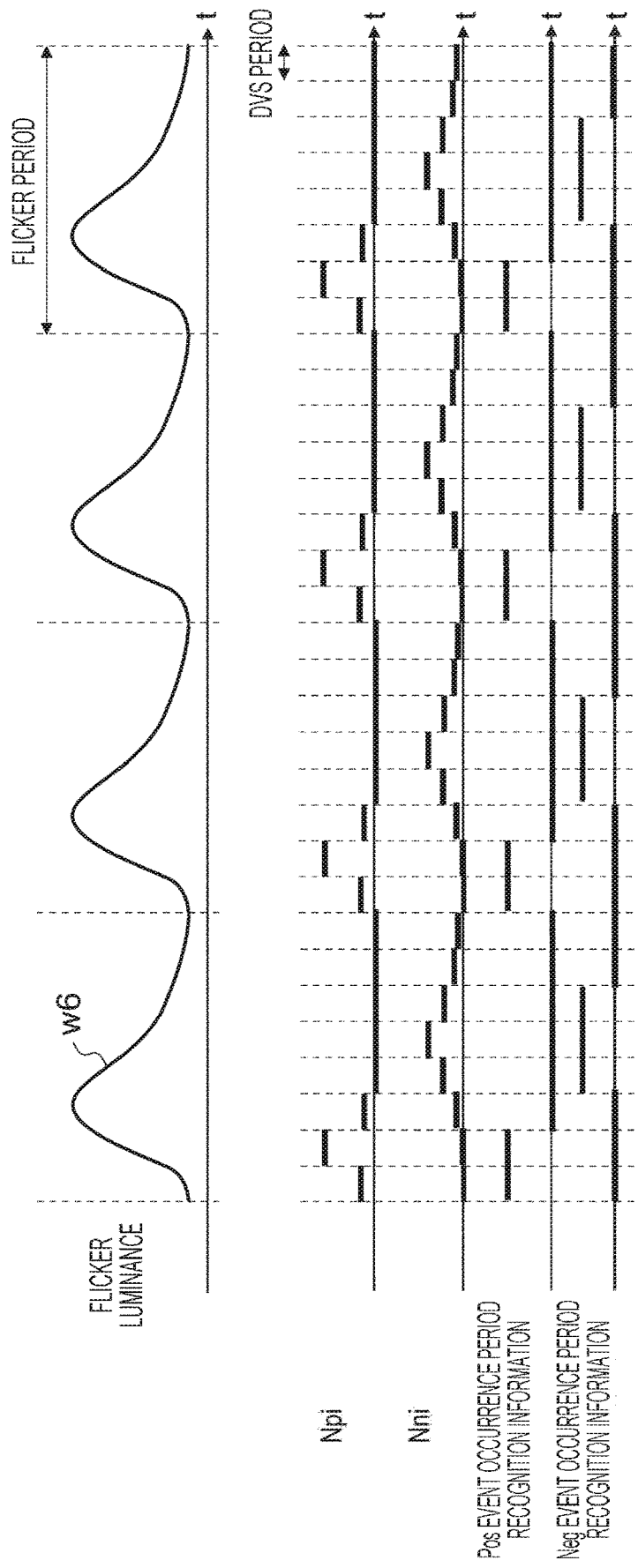
FIG. 15 is a diagram for describing processing operation of a flicker detection section including a first detection section and a flicker determination section.

FIG. 15 is a diagram for describing processing operation of the flicker detection section 54 including the first detection section 51 and the flicker determination section 52. FIG. 15 illustrates an example where light that flickers impinges on the imaging device 20. As indicated by a waveform w6 illustrated in FIG. 15, flicker luminance periodically varies. FIG. 15 illustrates the number of pixels Npi at which the Pos event has been detected, the number of pixels Nni at which the Neg event has been detected, information recognized by the flicker determination section 52 as an occurrence period of the Pos event (Pos event occurrence period), and information recognized as an occurrence section of the Neg event (Neg event occurrence period).

The flicker determination section 52 recognizes, as the Pos event occurrence period, a period in which a value obtained by subtracting Nni from Npi (Npi−Nni) exceeds a predetermined value, and recognizes, as the Neg event occurrence period, a period in which a value obtained by subtracting Npi from Nni (Nni−Npi) exceeds a predetermined value. In a case where the flicker frequency is low, both the Pos event occurrence period and the Neg event occurrence period may be zero.

In the example illustrated in FIG. 15, both the Pos event occurrence period and the Neg event occurrence period are the same as the flicker variation period. The flicker determination section 52 therefore determines that the Pos event and the Neg event are caused by a flicker.

Figure 16:
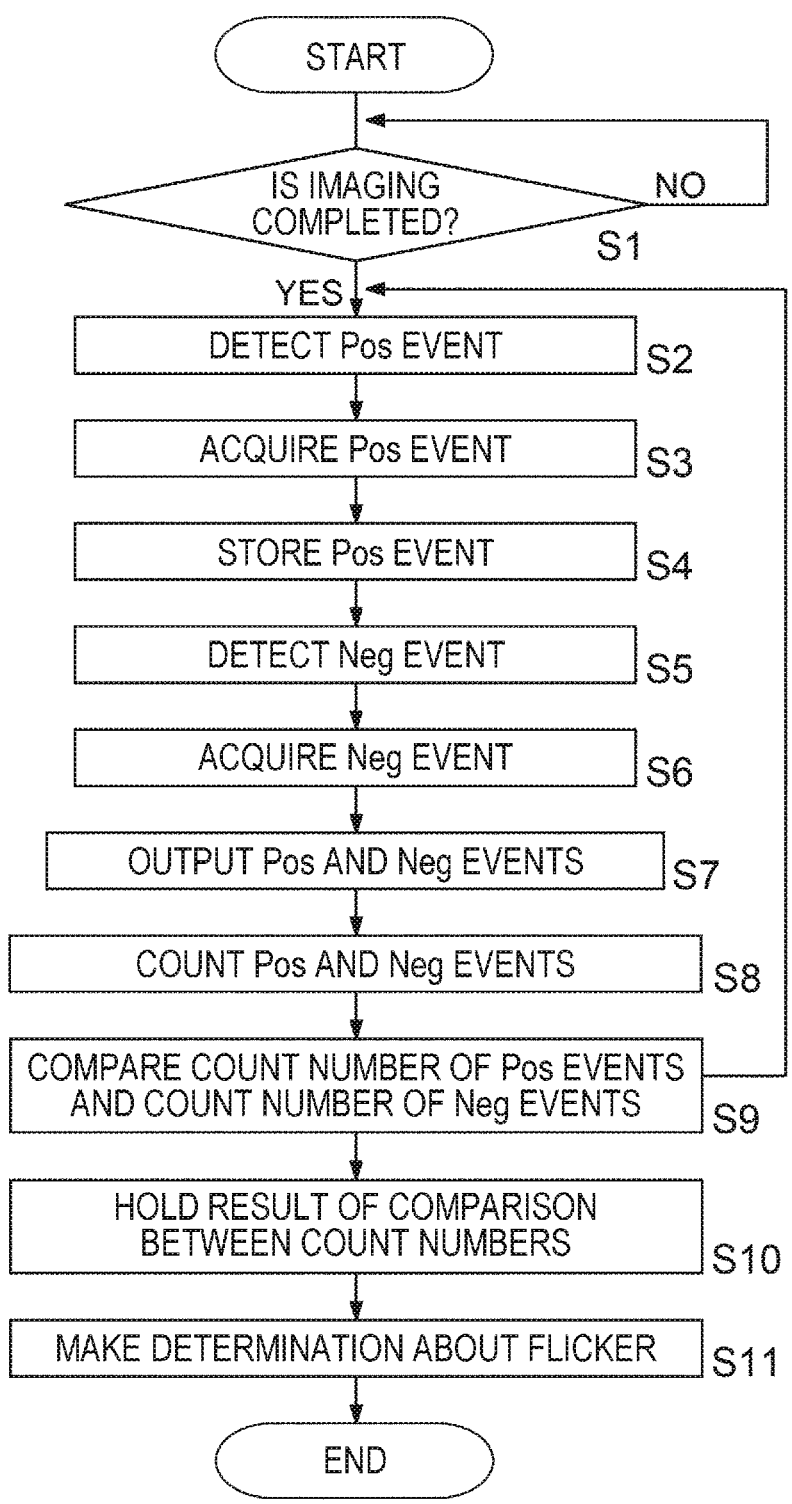
FIG. 16 is a flowchart illustrating a first example of the processing operation of the flicker detection section.

FIG. 16 is a flowchart illustrating a first example of the processing operation of the flicker detection section 54. FIG. 16 illustrates processing operation of the flicker detection section 54 in the imaging device 20 of a scanning type illustrated in FIG. 9. FIG. 16 illustrates an example where the Pos event and the Neg event are alternatively detected in a time-division manner.

First, after waiting until the imaging device 20 completes imaging for one frame (step S1), and the output signal of each pixel is sequentially read. When the Pos event is detected (step S2), the first detection section 51 acquires the Pos event (step S3). The first detection section 51 stores the acquired Pos event (step S4).

After the detection of the Pos event, whether or not the Neg event has occurred is detected, and when the Neg event is detected (step S5), the first detection section 51 acquires the Neg event (step S6). The first detection section 51 outputs the Pos event and the Neg event (step S7).

The flicker determination section 52 counts the number of the Pos events and the number of the Neg events (step S8). Then, the flicker determination section 52 compares the count number of the Pos events with the count number of the Neg events (step S9).

If the detection of the Pos event and the Neg event for all the pixels in the imaging device 20 has not yet been completed, step S2 and the subsequent steps are repeated. In a case where the event detection is completed, the result of comparison between the count number of the Pos events and the count number of the Neg events is held (step S10). The result of comparison is held within a period of any desired number of frames.

Next, it is determined whether or not the Pos events and the Neg events have been caused by a flicker on the basis of the result of comparison between the count number of the Pos events and the count number of the Neg events, and the determination result is output (step S11).

Figure 17:
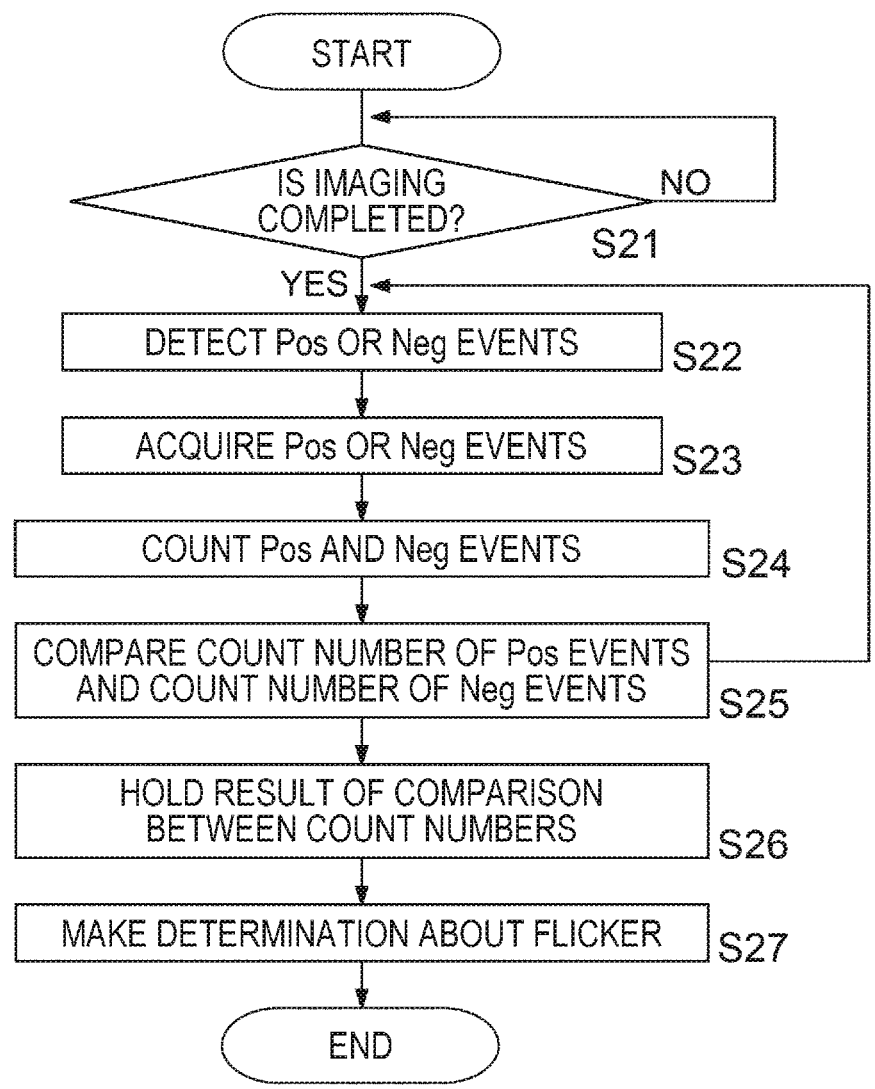
FIG. 17 is a flowchart illustrating a second example of the processing operation of the flicker detection section.

FIG. 17 is a flowchart illustrating a second example of the processing operation of the flicker detection section 54. FIG. 17 illustrates processing operation of the flicker detection section 54 in the imaging device 20 of a scanning type illustrated in FIG. 9. FIG. 17 illustrates an example where the Pos event and the Neg event are read in parallel.

First, after waiting until the imaging device 20 completes imaging for one frame (step S21), and the output signal of each pixel is sequentially read. When the Pos event or the Neg event is detected (step S22), the first detection section 51 acquires the Pos event or the Neg event (step S23).

The flicker determination section 52 counts the number of the Pos events and the number of the Neg events (step S24). Then, the flicker determination section 52 compares the count number of the Pos events with the count number of the Neg events (step S25).

If the detection of the Pos event and the Neg event for all the pixels in the imaging device 20 has not yet been completed, step S22 and the subsequent steps are repeated. In a case where the event detection is completed, the result of comparison between the count number of the Pos events and the count number of the Neg events is held (step S26). The result of comparison is held within a period of any desired number of frames.

Next, it is determined whether or not the Pos events and the Neg events have been caused by a flicker on the basis of the result of comparison between the count number of the Pos events and the count number of the Neg events, and the determination result is output (step S27).

Figure 18:
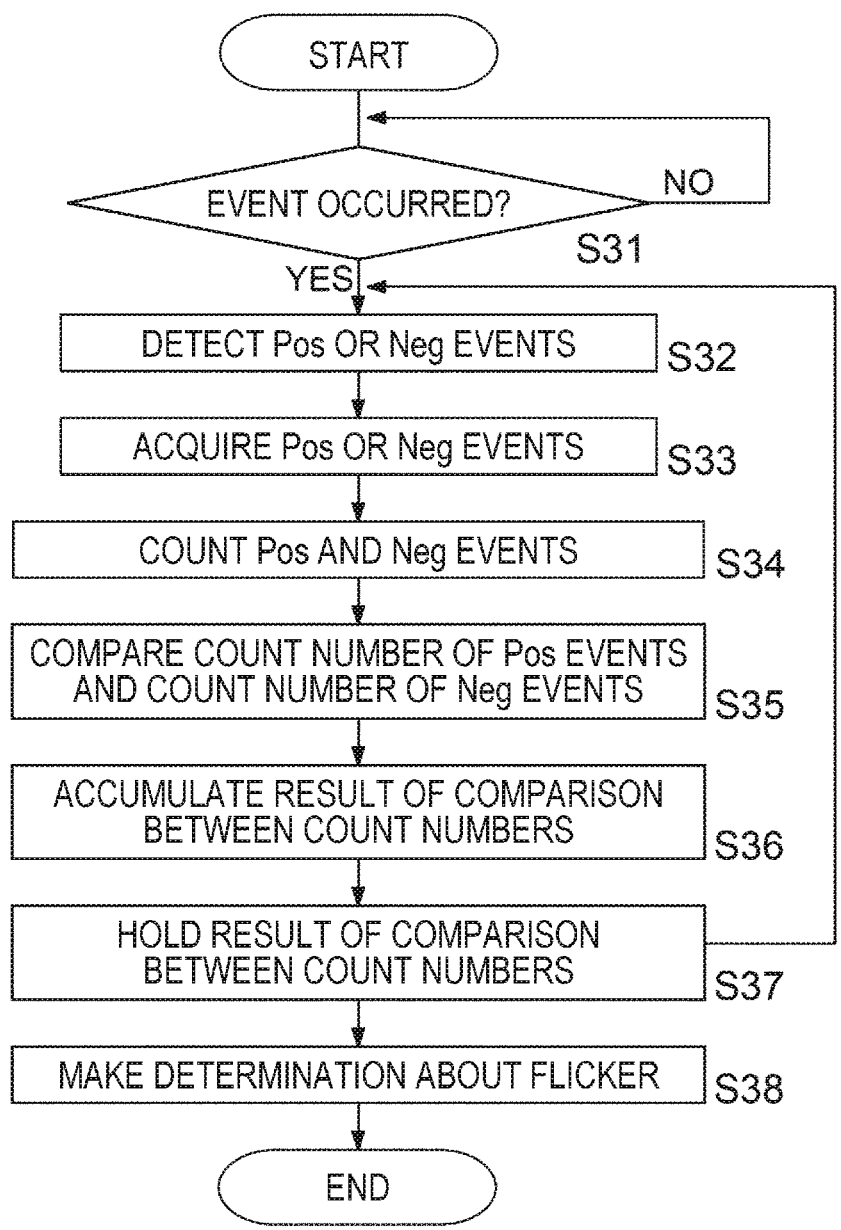
FIG. 18 is a flowchart illustrating a third example of the processing operation of the flicker detection section.

FIG. 18 is a flowchart illustrating a third example of the processing operation of the flicker detection section 54. FIG. 18 illustrates processing operation of the flicker detection section 54 in the imaging device 20 of an asynchronous type illustrated in FIG. 2. FIG. 18 illustrates an example where event detection is performed asynchronously for each row of the pixel array section.

First, after waiting until the Pos event or the Neg event occurs (step S31), and when the Pos event or the Neg event is detected (step S32), the first detection section 51 acquires the Pos event or the Neg event (step S33).

The flicker determination section 52 counts the number of the Pos events and the number of the Neg events (step S34). Then, the flicker determination section 52 compares the count number of the Pos events with the count number of the Neg events (step S35). Next, the result of comparison between the count numbers is accumulated during any desired period (step S36). Next, the accumulated result of comparison is held during any desired period (step S37).

If the counting of the Pos events and the Neg events has not yet been completed, step S32 and the subsequent steps are repeated.

In a case where the counting of the Pos events and the Neg events is completed, it is determined whether or not the Pos events and the Neg events have been caused by a flicker on the basis of the result of comparison between the count number of the Pos events and the count number of the Neg events, and the determination result is output (step S38).

Figure 19:
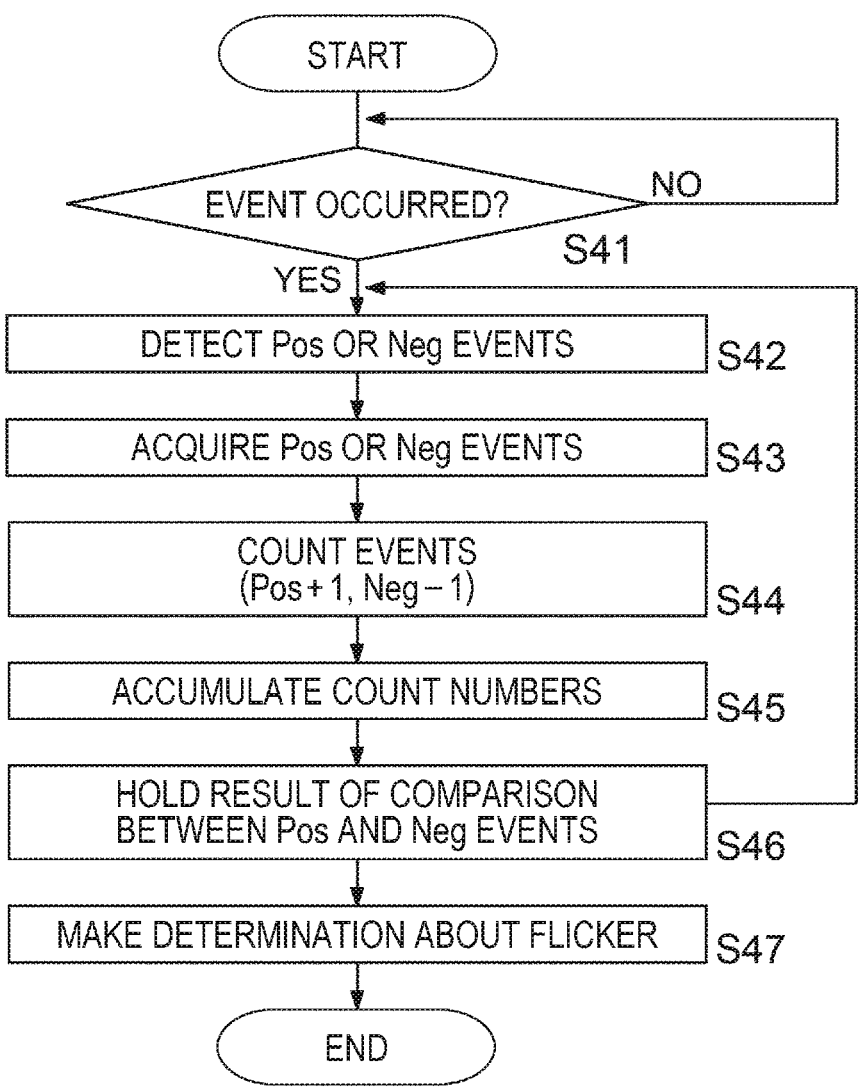
FIG. 19 is a flowchart illustrating a fourth example of the processing operation of the flicker detection section.

FIG. 19 is a flowchart illustrating a fourth example of the processing operation of the flicker detection section 54. FIG. 19 illustrates processing operation of the flicker detection section 54 in the imaging device 20 of an asynchronous type illustrated in FIG. 2. FIG. 19 illustrates an example where event detection is performed asynchronously for each pixel of the pixel array section.

First, after waiting until the Pos event or the Neg event occurs (step S41), and when the Pos event or the Neg event is detected (step S42), the first detection section 51 acquires the Pos event or the Neg event (step S43).

The flicker determination section 52 counts up the counter when the Pos event is detected, and counts down the counter when the Neg event is detected (step S44). Then, the count value of the counter is held during any desired period (step S45).

If the processing of detecting all the Pos events and Neg events that have occurred has not yet been completed, step S42 and the subsequent steps are repeated. In a case where the event detection is completed, the result of comparison between the Pos events and the Neg events is held on the basis of the count value of the counter (step S46). Note that the holding period is determined as desired.

Next, it is determined whether or not the Pos events and the Neg events have been caused by a flicker on the basis of the counter value of the counter, and the determination result is output (step S47).

In step S11 of FIG. 16, step S27 of FIG. 17, step S37 of FIG. 18, and step S47 of FIG. 19, in a case where any one of the following conditions 1) to 3) is satisfied, it is determined that the Pos events and the Neg events have been caused by a flicker.

1) A case where a frame in which only the number of Pos events is extremely large and a frame in which only the number of Neg events is extremely large alternately appear.

2) A case where peaks of the number of detected events appear in synchronization with Pos events and Neg events.

3) A case where an interval between peaks of the number of detected events is equal to a period of the flicker.

Figure 20:
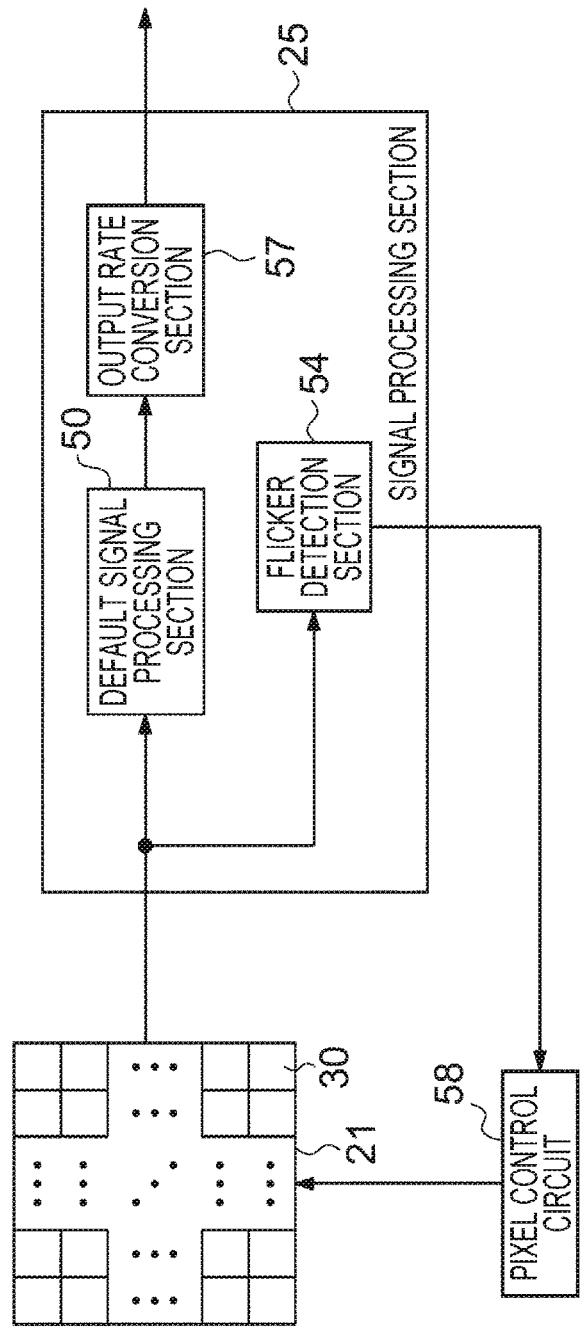
FIG. 20 is a block diagram illustrating a first specific example of the signal processing section.

FIG. 20 is a block diagram illustrating a first specific example of the signal processing section 25. The signal processing section 25 illustrated in FIG. 20 includes an output rate conversion section 57 in addition to the flicker detection section 54 including the first detection section 51 and the flicker determination section 52 similar to the flicker detection section 54 illustrated in FIG. 14. A pixel control circuit 58 is connected to the signal processing section 25 illustrated in FIG. 20. The pixel control circuit 58 corresponds to the second detection section 53 illustrated in FIG. 14. The pixel control circuit 58 may be provided inside the signal processing section 25.

The pixel control circuit 58 sets an event detection period in accordance with the period of the flicker on the basis of the result of determination performed by the flicker determination section 52. The pixel control circuit 58 transmits a signal indicating the event detection period to the address event detection section 33 in the pixel array section 21. The address event detection section 33 performs event detection within the event detection period set by the pixel control circuit 58. It is therefore possible to detect an event different from an event caused by a flicker.

As described above, the pixel control circuit 58 has a function of a period detection section that detects the period of the flicker in a case where the flicker determination section determines that a detection signal caused by a flicker is included, and a function of a detection period setting section that sets the detection signal detection period in accordance with the period of the flicker detected by the period detection section.

The signal processing section 25 and the pixel control circuit 58 illustrated in FIG. 20 control, in an analog manner, a period within which the address event detection section 33 detects an event. Specifically, the event detection period is set in an analog manner so as to be different from the occurrence period of the Pos event and the Neg event caused by a flicker.

The block diagram illustrated in FIG. 20 is applicable to the imaging device 20 of a scanning type and is not applicable to the imaging device 20 of an asynchronous type. The reason is that the address event detection section 33 detects an event only within the event detection period set by the pixel control circuit 58 and cannot detect an event asynchronously.

Figure 21:
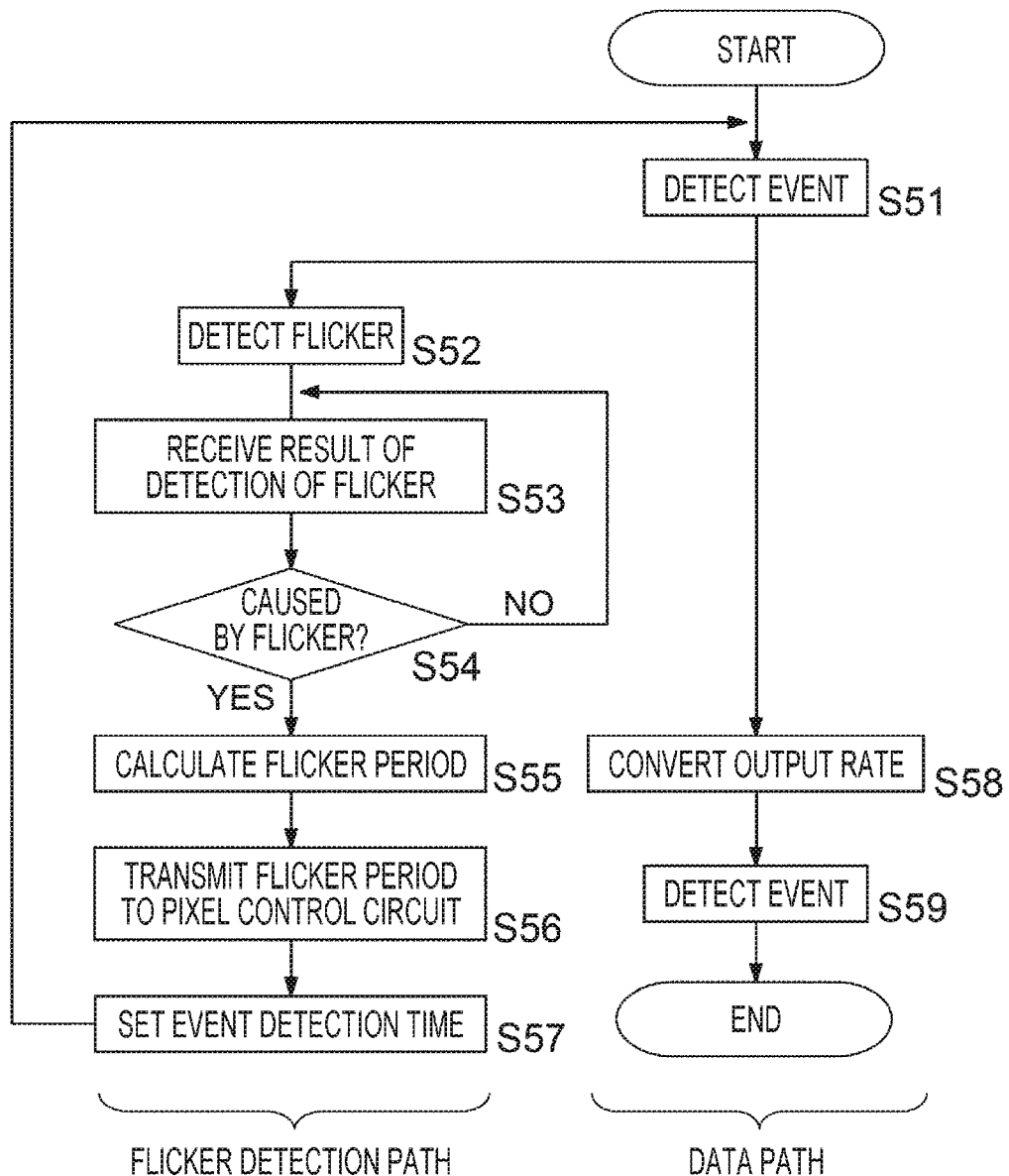
FIG. 21 is a flowchart illustrating processing operation of the signal processing section illustrated in FIG. 20.

FIG. 21 is a flowchart illustrating processing operation of the signal processing section 25 illustrated in FIG. 20. Steps S52 to S57 of FIG. 21 correspond to a flicker detection path, and steps S58, S59 correspond to a data path after flicker detection.

When an event is detected (step S51), the flicker detection section 54 performs processing of detecting whether or not the detected event has been caused by a flicker (step S52). Upon receipt of the detection result of the flicker detection section 54 (step S53), it is determined whether or not the event has been caused by a flicker (step S54).

In a case where it is determined that the event has been caused by a flicker, the flicker detection section 54 calculates a period of the flicker (step S55), and transmits the calculated period of the flicker to the pixel control circuit 58 (step S56). The pixel control circuit 58 sets the event detection period on the basis of the period of the flicker and in accordance with the period of the flicker (step S57).

Thereafter, the address event detection section 33 performs event detection within the event detection period. After an event detected and output by the address event detection section 33 is detected in step S51, an output rate of the event is converted by the output rate conversion section 57 (step S58). Since the address event detection section 33 detects an event only within the event detection period, the event output frequency decreases, so that the output rate conversion section 57 performs control of lowering the output rate. Therefore, an event signal of an output rate corresponding to the length of the event detection period is output from the signal processing section 25 (step S59).

Figure 22:
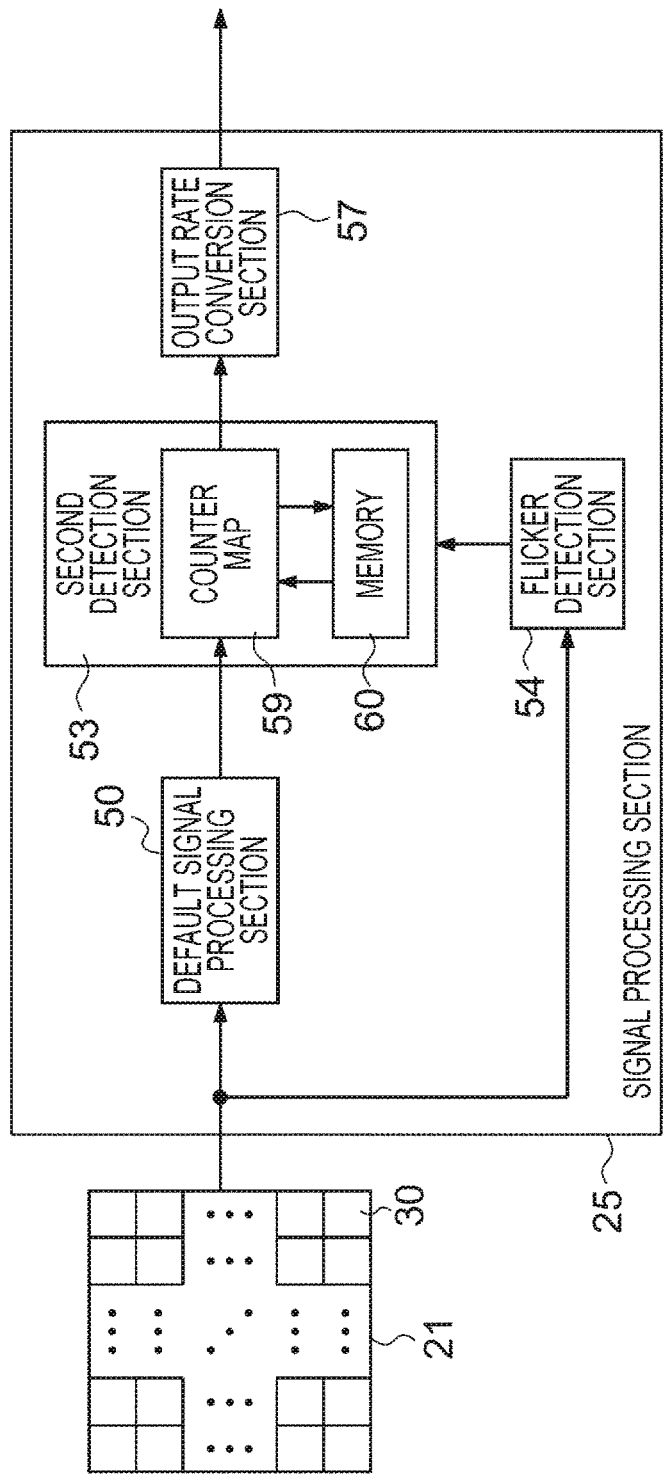
FIG. 22 is a block diagram illustrating a second specific example of the signal processing section.

FIG. 22 is a block diagram illustrating a second specific example of the signal processing section 25. The signal processing section 25 illustrated in FIG. 22 includes the first detection section 51, the flicker determination section 52, the second detection section 53, and the output rate conversion section 57, but is not provided with a component corresponding to the pixel control circuit 58 illustrated in FIG. 21.

The flicker detection section 54 illustrated in FIG. 22 notifies the second detection section 53 of the presence or absence of a flicker and the length of one period of the flicker. The second detection section 53 includes a counter map 59 and a memory 60 that stores information of the counter map 59. As illustrated in FIG. 23, the counter map 59 is an aggregation of counters 59a each associated with a corresponding one of the pixels of the pixel array section 21. In order to count events occurring within the period notified from the flicker detection section 54, each counter 59a is counted up when the Pos event is detected in a corresponding pixel and is counted down when the Neg event is detected. A count value of a counter 59a of a pixel in which only an event caused by a flicker has occurred is zero. A count value of a counter 59a of a pixel in which an event caused by a factor other than a flicker has occurred is a value other than zero. The memory 60 stores the count value of each counter 59a of the counter map 59.

As described above, in a case where the flicker detection section 54 determines that the detection signal caused by a flicker is included, the second detection section 53 illustrated in FIG. 22 detects the number of occurrences of events caused by a factor other than a flicker by counting the number of events detected within the period of the flicker.

The signal processing section 25 illustrated in FIG. 22 determines whether an event is caused by a flicker or an event caused by a factor other than a flicker on the basis of the count value of each counter 59a of the counter map 59, and performs event detection by means of digital processing. The processing of the signal processing section 25 illustrated in FIG. 22 is applicable to both the imaging device 20 of an asynchronous type illustrated in FIG. 2 and the imaging device 20 of a scanning type illustrated in FIG. 9.

Figure 24:
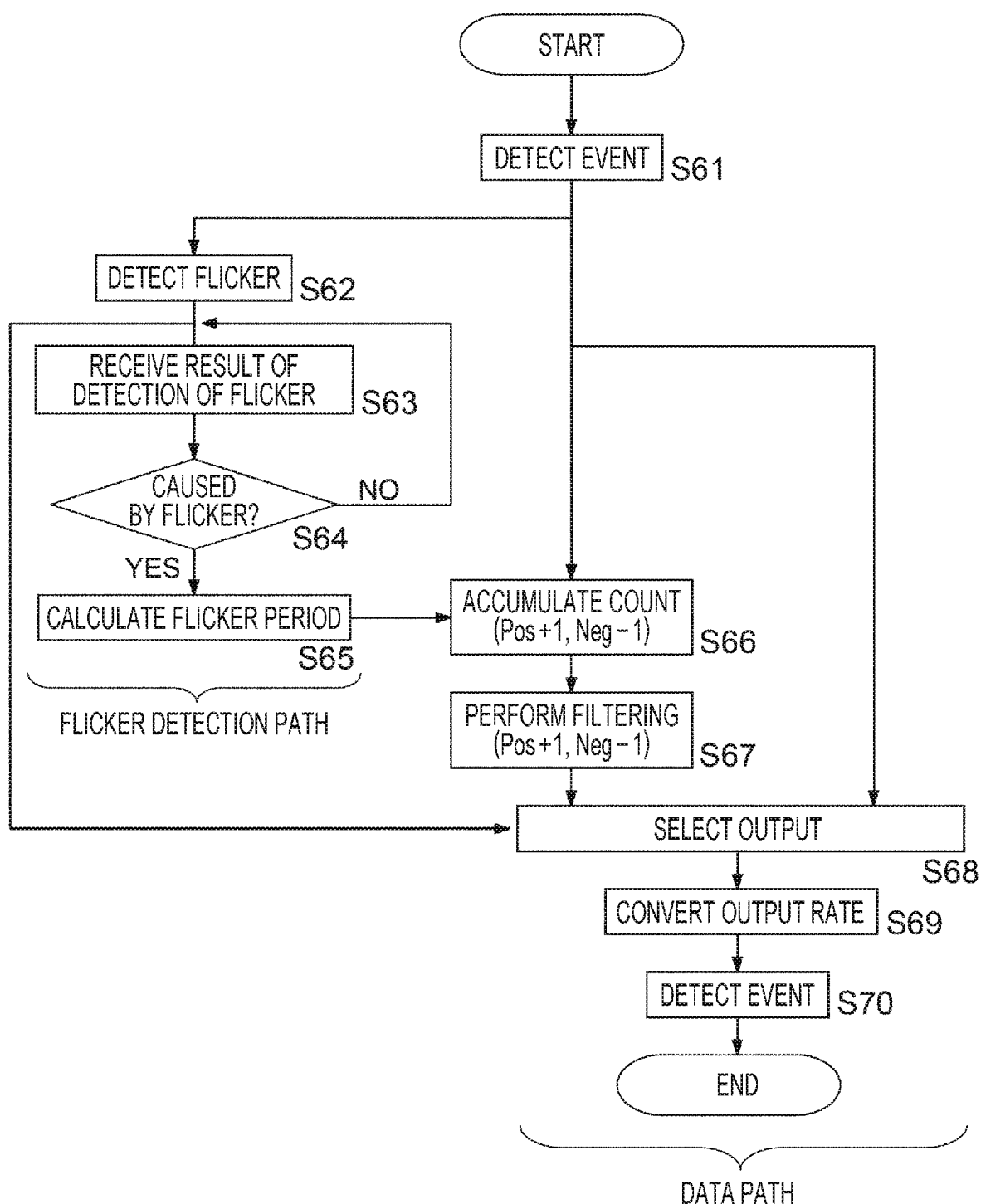
FIG. 24 is a flowchart illustrating processing operation of the signal processing section illustrated in FIG. 22.

FIG. 24 is a flowchart illustrating processing operation of the signal processing section 25 illustrated in FIG. 22. Steps S62 to S65 of FIG. 24 corresponds to the flicker detection path, and steps S66 to S70 correspond to the data path after flicker detection.

In steps S61 to S65, the period of the flicker is calculated in a similar manner to steps S51 to S55 of FIG. 22.

In a case where a flicker is detected, the counter map 59 illustrated in FIG. 22 is activated. Specifically, in step S66, the counter map 59 illustrated in FIG. 22 is used to count up or count down the counter 59a corresponding to the detected Pos event or Neg event. Next, each count value of the counter map 59 is subjected to filtering (step S67). For example, in step S67, a count value considered to correspond to an event caused by noise among the count values of the counter map 59 is corrected.

Next, among the count values of the counter map 59, a count value far from zero is considered to correspond to an event caused by a factor other than a flicker, and thus the event is output.

In step S68, either an event detected by the counter map 59 or an event detected by the first detection section 51 is selected. Here, in a case where it is determined that there is an event caused by a flicker, the event detected by the counter map 59 is selected; and, in a case where it is determined that there is no event caused by a flicker, the event detected by the first detection section 51 is selected. Next, the output rate of the selected event is converted by the output rate conversion section 57 as necessary (step S69), and the event is output (step S70).

Although FIGS. 20 to 24 described above illustrate an example where events detected by the address event detection section 33 are subjected to filtering by means of analog processing or digital processing by the signal processing section 25, an event caused by a factor other than a flicker may be detected with focus placed on characteristics of an event caused by a flicker.

Figure 25:
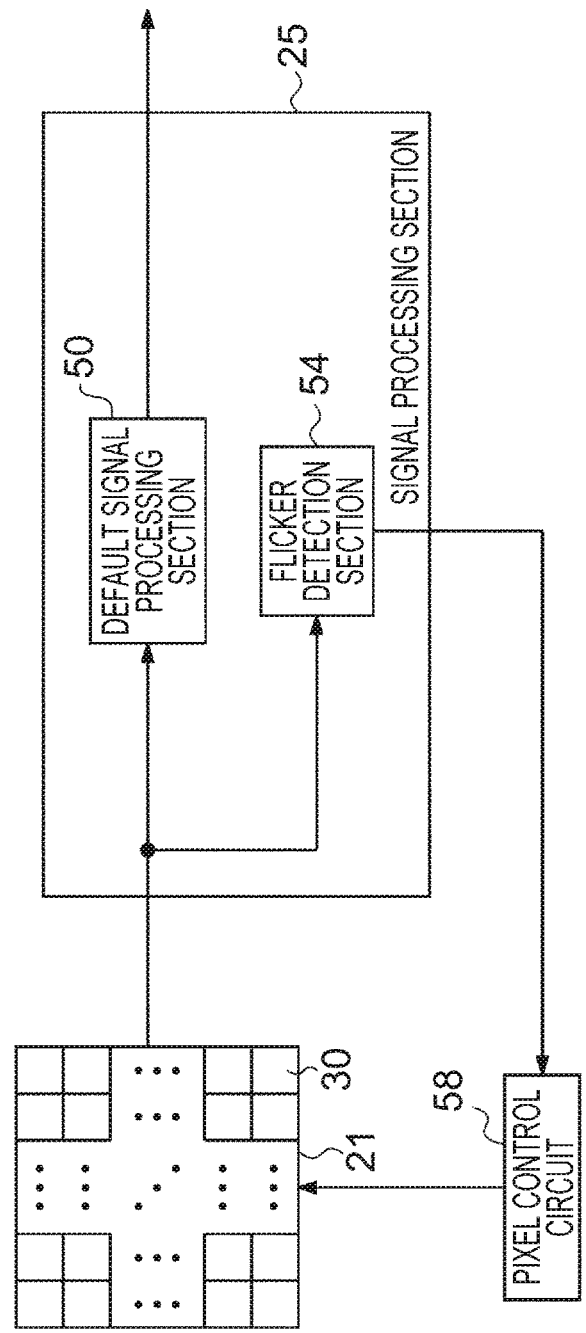
FIG. 25 is a block diagram illustrating a third specific example of the signal processing section.

FIG. 25 is a block diagram illustrating a third specific example of the signal processing section 25. The signal processing section 25 illustrated in FIG. 25 includes the flicker detection section 54 including the first detection section 51 and the flicker determination section 52. Note that the signal processing section 25 is not provided with an output rate control section.

The pixel control circuit 58 is connected to the signal processing section 25 illustrated in FIG. 25. The pixel control circuit 58 corresponds to the second detection section 53 illustrated in FIG. 14, and detects, as an event (detection signal) caused by a factor other than a flicker, an event (detection signal) in a case where the flicker determination section 52 determines that an event (detection signal) caused by a flicker is included, and the absolute value of the amount of downward change in signal level of the electrical signal exceeds a second threshold within a period in which the Pos event (first detection signal) is detected, or the absolute value of the amount of upward change in signal level of the electrical signal within a period in which the Neg event (second detection signal) is detected exceeds a first threshold.

As described above, in both a case where the Neg event occurs within the flicker Pos event occurrence period and a case where the Pos event occurs within the flicker Neg event occurrence period, both the events are considered to be caused by a factor other than a flicker, so that the pixel control circuit 58 detects the events.

Figure 26A:
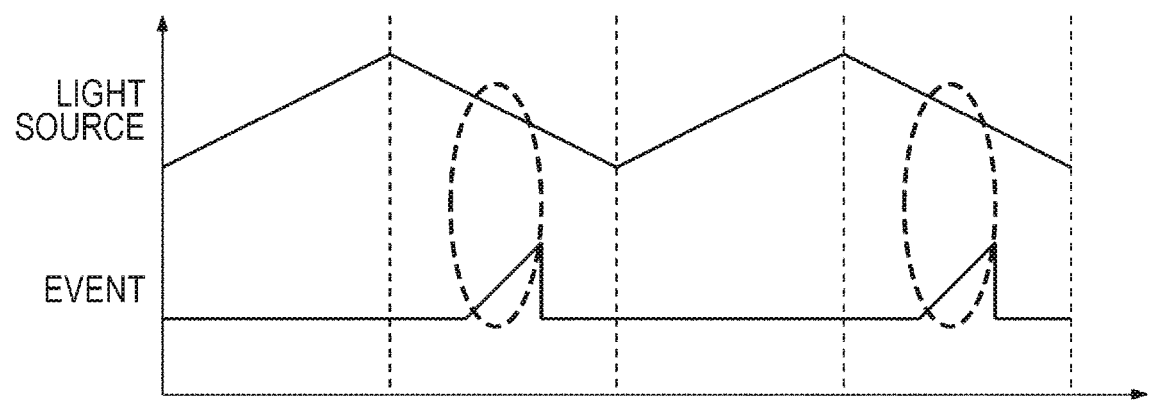
FIG. 26A is a diagram schematically illustrating how a pixel control circuit operates.
Figure 26B:
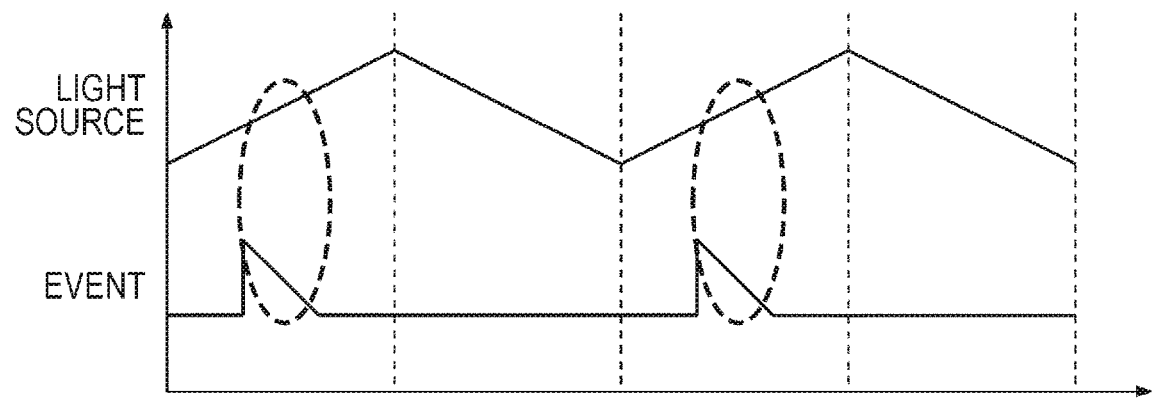
FIG. 26B is a diagram schematically illustrating how the pixel control circuit operates.

FIGS. 26A and 26B are diagrams schematically illustrating how the pixel control circuit 58 operates. FIG. 26A illustrates an example where an event in which the luminance increases occurs while the luminance of the light source is decreasing. A period during which the luminance of the light source is decreasing corresponds to the flicker Neg event occurrence period. Within this period, no Pos event is detected from the light source. Therefore, when the Pos event is detected within this period, the event can be determined to be caused by a factor other than a flicker.

FIG. 26B illustrates an example where an event in which the luminance decreases occurs while the luminance of the light source is increasing. A period during which the luminance of the light source is increasing corresponds to the flicker Pos event occurrence period. Within this period, no Neg event is detected from the light source. Therefore, when the Neg event is detected within this period, the event can be determined to be caused by a factor other than a flicker.

The pixel control circuit 58 illustrated in FIG. 25 detects, by means of analog processing, the Neg event within the flicker Pos event occurrence period and the Pos event within the flicker Neg event occurrence period.

Figure 27:
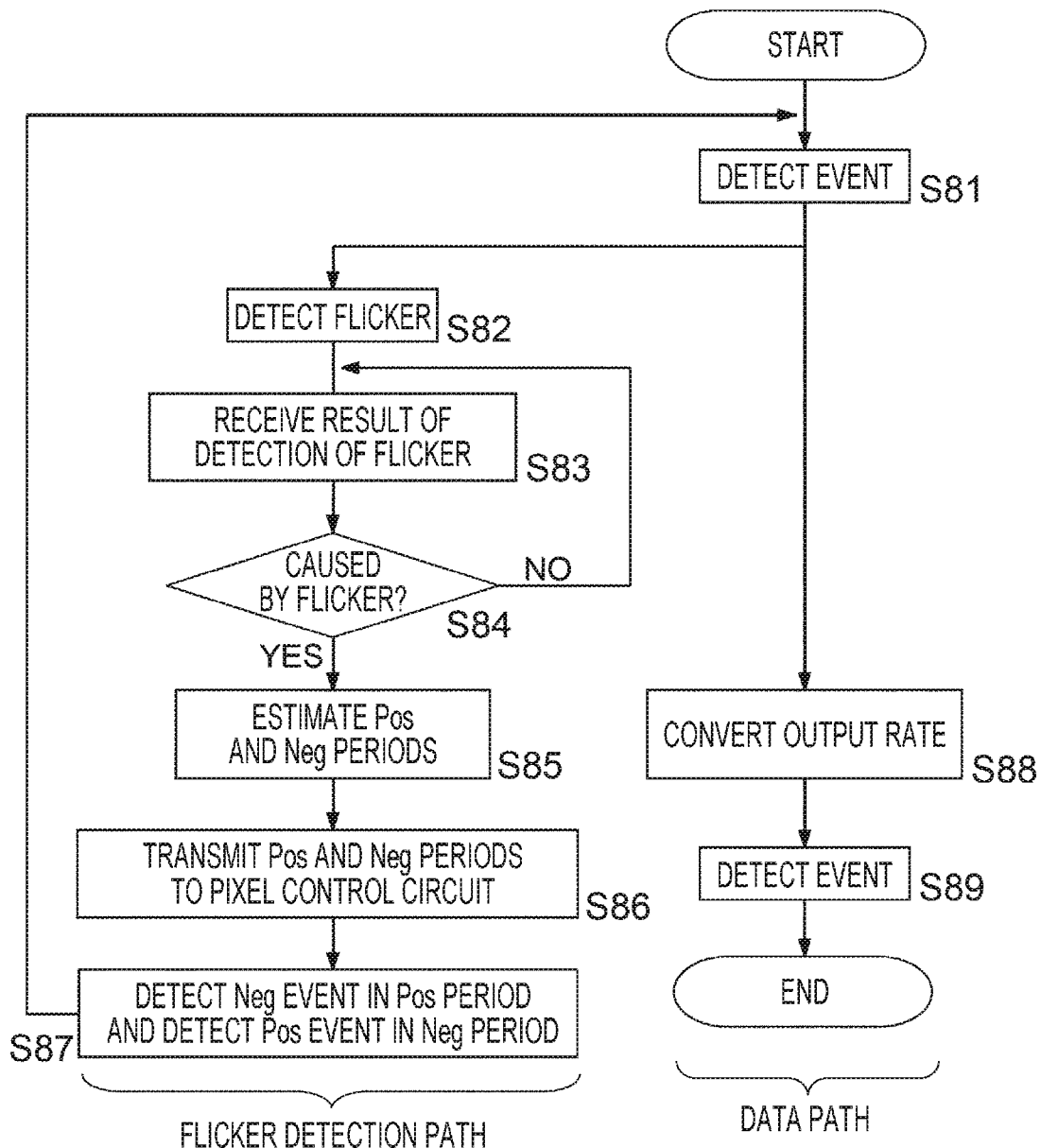
FIG. 27 is a flowchart illustrating processing operation of the signal processing section illustrated in FIG. 25.

FIG. 27 is a flowchart illustrating processing operation of the signal processing section 25 illustrated in FIG. 25. Steps S82 to S87 of FIG. 27 corresponds to the flicker detection path, and steps S88, S89 correspond to the data path after flicker detection.

When an event is detected (step S81), the processing of the flicker detection section 54 is performed (step S82). Upon receipt of the processing result of the flicker detection section 54 (step S83), and it is determined whether or not the event has been caused by a flicker (step S84).

In a case where it is determined that the event has been caused by a flicker, the flicker detection section 54 estimates the Pos event occurrence period and the Neg event occurrence period (step S85). The flicker detection section 54 transmits the estimated Pos event occurrence period and Neg event occurrence period to the pixel control circuit 58 (step S86).

Next, the pixel control circuit 58 instructs the address event detection section 33 to detect the Neg event within the Pos event occurrence period and to detect the Pos event within the Neg event occurrence period (step S87).

The output rate conversion section 57 converts the output rate of the Neg event within the Pos event occurrence period and the Pos event within the Neg event occurrence period, the Neg event and the Pos event being detected by the address event detection section 33 (step S88), and outputs the Neg event and the Pos event (step S89).

Figure 28:
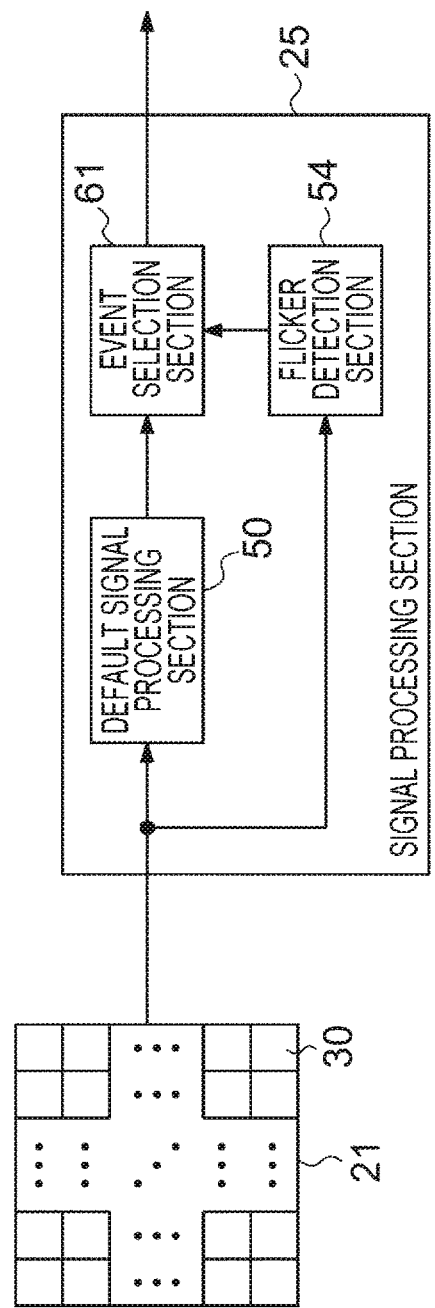
FIG. 28 is a block diagram illustrating a fourth specific example of the signal processing section.

FIG. 28 is a block diagram illustrating a fourth specific example of the signal processing section 25. The signal processing section 25 illustrated in FIG. 28 includes the first detection section 51, the flicker determination section 52, and an event selection section 61. The event selection section 61 corresponds to the second detection section 53 illustrated in FIG. 14. Among events detected by the address event detection section 33, the event selection section 61 detects the Neg event within the Pos event occurrence period and the Pos event within the Neg event occurrence period, the Neg event and the Pos event being caused by a flicker. That is, the event selection section 61 discards the Pos event caused by a flicker within the Pos event occurrence period to detect the Neg event, and discards the Neg event within the Neg event occurrence period to detect the Pos event.

Figure 29:
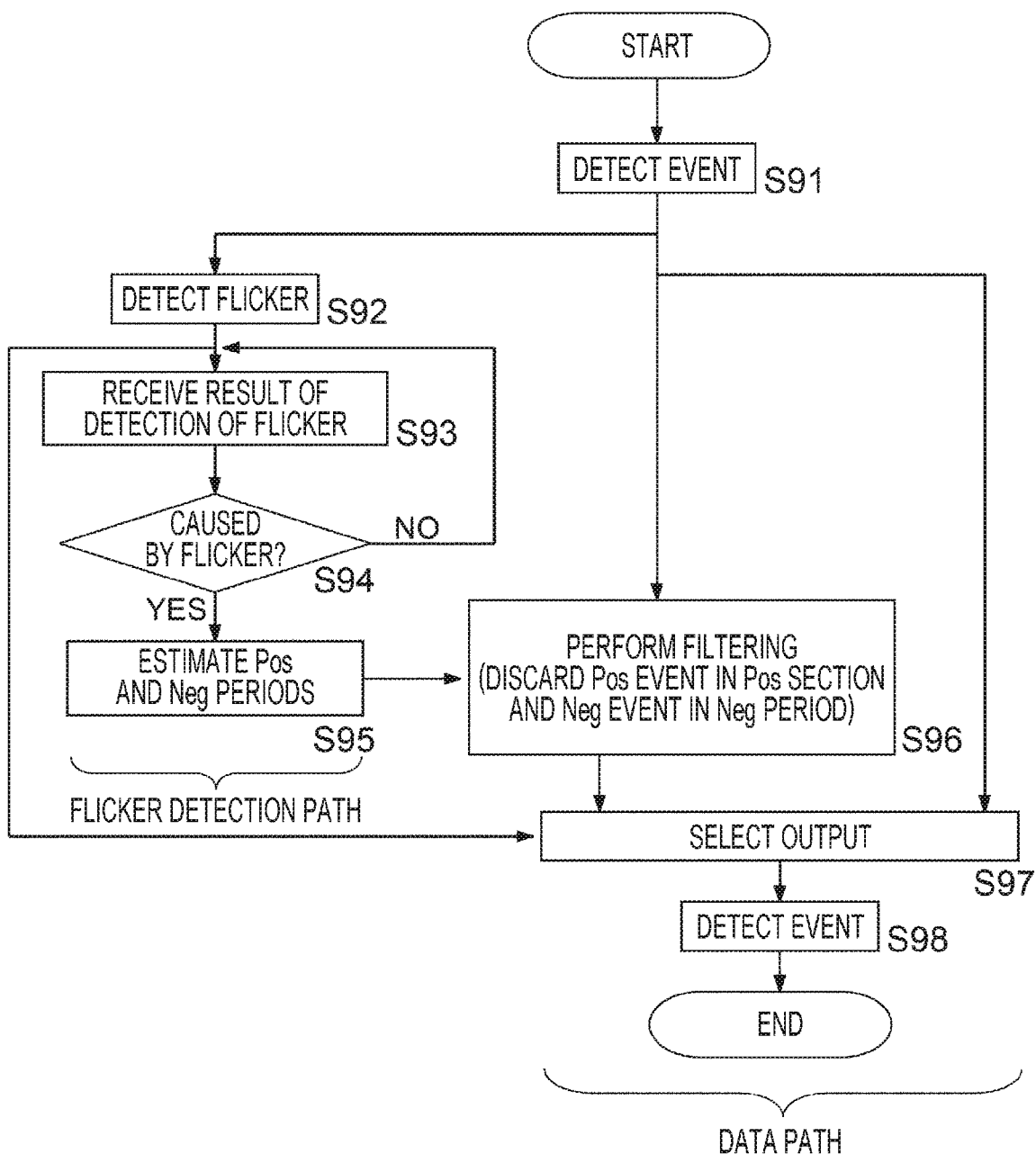
FIG. 29 is a flowchart illustrating processing operation of the signal processing section illustrated in FIG. 28.

FIG. 29 is a flowchart illustrating processing operation of the signal processing section 25 illustrated in FIG. 28. Steps S92 to S95 of FIG. 29 corresponds to the flicker detection path, and steps S96 to S98 correspond to the data path after flicker detection.

The processing in steps S91 to S95 is the same as the processing in steps S81 to S85 of FIG. 27. The event selection section 61 discards the Pos event caused by a flicker within the Pos event occurrence period estimated in step S85 to detect the Neg event, and discards the Neg event within the Neg event occurrence period to detect the Pos event (step S96).

In a case where an event caused by a flicker has occurred, the event detected in step S96 is selected, and in a case where an event caused by a flicker has not occurred, the event detected by the first detection section 51 is selected (step S97). The signal processing section 25 outputs the event selected in step S97 (step S98).

The signal processing section 25 illustrated in FIG. 28 is not provided with the output rate conversion section 57, but only some of the events detected by the address event detection section 33 are output from the signal processing section 25, so that it may be necessary to control event output timing.

Figure 30:
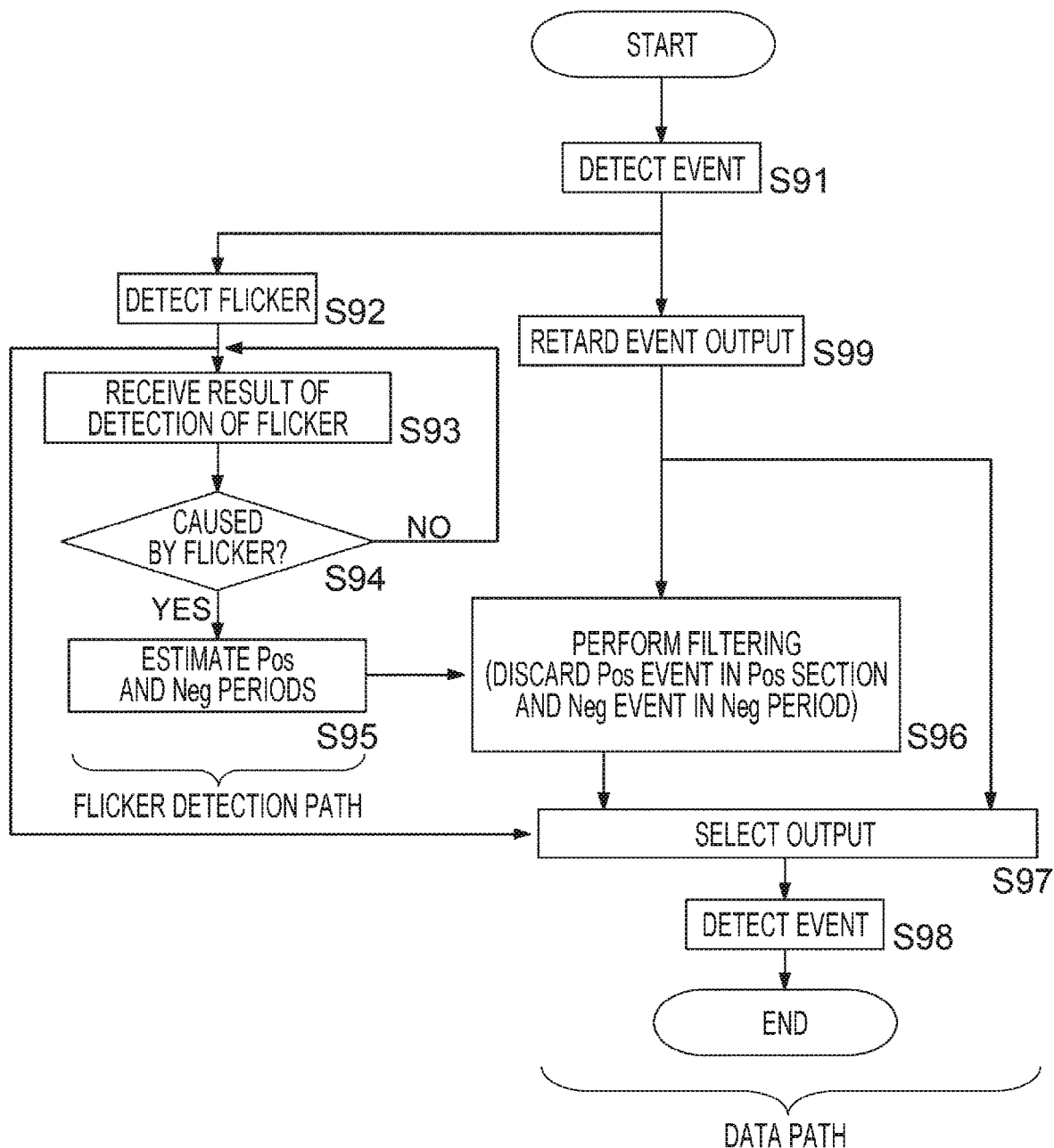
FIG. 30 is a flowchart obtained by partially changing FIG. 29.

FIG. 30 is a flowchart obtained by partially changing FIG. 29. In step S99 of FIG. 30, processing of retarding the output timing of the event output from the address event detection section 33 is performed. Thus, step S99 may accommodate a signal delay caused by the processing in steps S92 to S95.

As described above, in the present embodiment, when an event occurs, processing of determining whether or not the event has been caused by a flicker and detecting only an event caused by a factor other than a flicker is performed. Thus, the influence of the event caused by a flicker is prevented. More specifically, it is possible to detect an event caused by a factor other than a flicker by detecting the flicker occurrence period and detecting an event that occurs within a period other than the flicker occurrence period. Alternatively, since the event caused by a flicker has the Pos event and the Neg event that alternately occur, it is possible to detect an event caused by a factor other than a flicker by comparing the number of the Pos events with the number of the Neg events. Alternatively, since the Pos event occurrence period in which the Pos event occurs and the Neg event occurrence period in which the Neg event occurs can be predicted in advance for the event caused by a flicker, it is possible to detect an event caused by a factor other than a flicker by detecting the Neg event that has occurred within the Pos event occurrence period and the Pos event that has occurred within the Neg event occurrence period.

<Application Example of Technology According to Present Disclosure>

The technology according to the present disclosure is applicable to various products. Hereinafter, a more specific application example will be described. For example, the technology according to the present disclosure may be implemented as a distance-measuring device installed on any type of mobile object such as an automobile, an electric automobile, a hybrid electric automobile, a motorcycle, a bicycle, a personal transporter, a plane, a drone, a ship, a robot, a construction machine, and an agricultural machine (tractor).

[Mobile Object]

Figure 31:
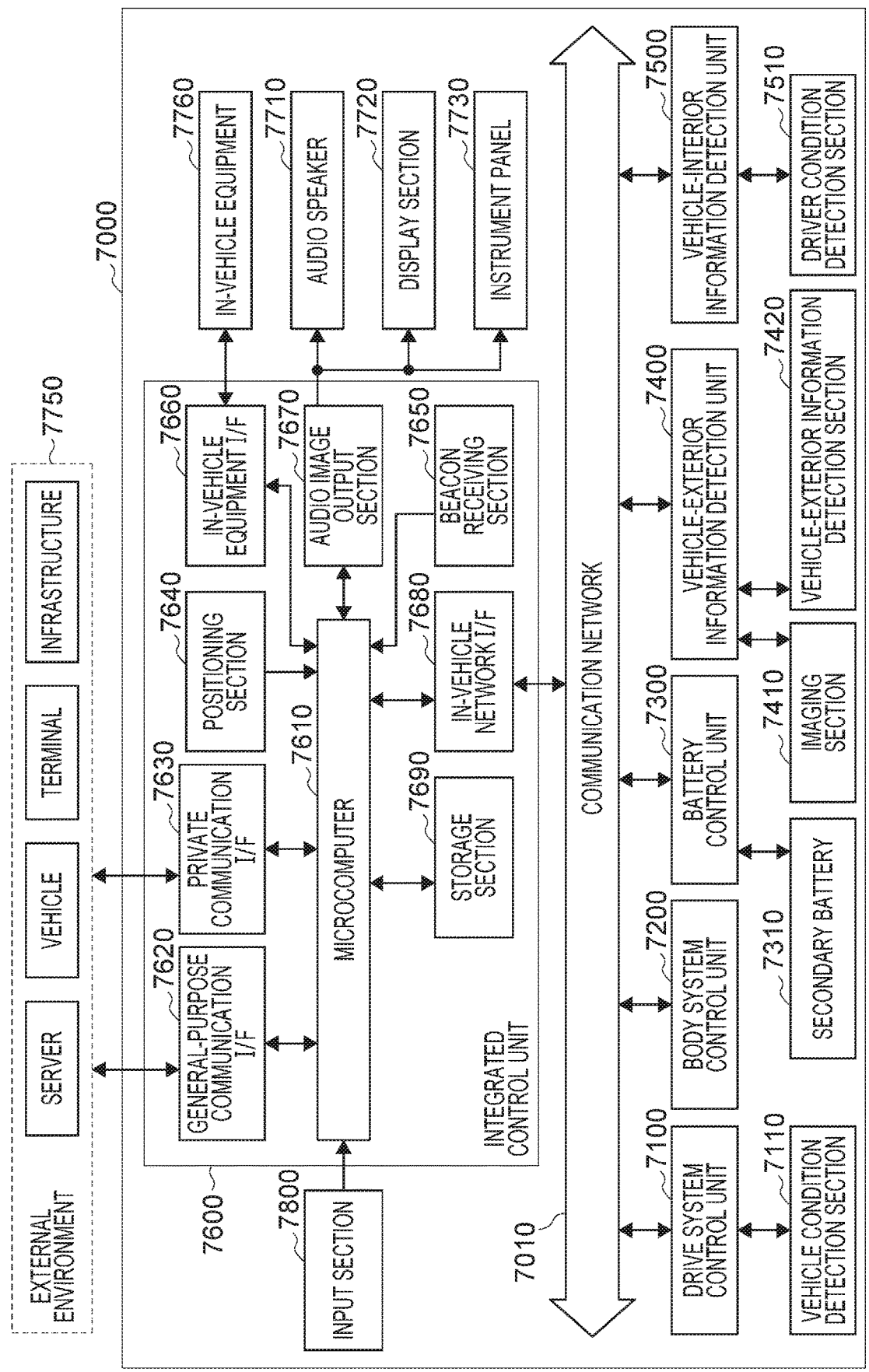
FIG. 31 is a block diagram illustrating a schematic configuration example of a vehicle control system that is an example of a mobile object control system to which the technology according to the present disclosure is applicable.

FIG. 31 is a block diagram illustrating a schematic configuration example of a vehicle control system 7000 that is an example of a mobile object control system to which the technology according to the present disclosure is applicable. The vehicle control system 7000 includes a plurality of electronic control units connected over a communication network 7010. In the example illustrated in FIG. 31, the vehicle control system 7000 includes a drive system control unit 7100, a body system control unit 7200, a battery control unit 7300, a vehicle-exterior information detection unit 7400, a vehicle-interior information detection unit 7500, and an integrated control unit 7600. The communication network 7010 connecting the plurality of control units may be, for example, an in-vehicle communication network conforming to any desired standard such as a controller area network (CAN), a local interconnect network (LIN), a local area network (LAN), or FlexRay (registered trademark).

Each control unit includes a microcomputer that performs operation processing in accordance with various programs, a storage section that stores the programs to be executed by the microcomputer, parameters used for various operations, and the like, and a drive circuit that drives various control target devices. Each control unit includes a network I/F for communicating with the other control units over the communication network 7010, and a communication I/F for communicating with a device, a sensor, or the like inside and outside the vehicle by means of wired communication or wireless communication. In FIG. 31, as functional components of the integrated control unit 7600, a microcomputer 7610, a general-purpose communication I/F 7620, a private communication I/F 7630, a positioning section 7640, a beacon receiving section 7650, an in-vehicle equipment I/F 7660, an audio image output section 7670, an in-vehicle network I/F 7680, and a storage section 7690 are illustrated. The other control units similarly include a microcomputer, a communication I/F, a storage section, and the like.

The drive system control unit 7100 controls operation of devices related to a drive system of a vehicle in accordance with various programs. For example, the drive system control unit 7100 functions as a control device of a driving force generation device for generating a driving force of the vehicle such as an internal combustion engine or a driving motor, a driving force transmission mechanism for transmitting the driving force to wheels, a steering mechanism for adjusting a steering angle of the vehicle, a braking device for generating a braking force of the vehicle, and the like. The drive system control unit 7100 may have a function as a control device of an antilock brake system (ABS), an electronic stability control (ESC), or the like.

A vehicle condition detection section 7110 is connected to the drive system control unit 7100. The vehicle condition detection section 7110 includes, for example, at least one of a gyroscope that detects an angular velocity of axial rotation motion of a vehicle body, an acceleration sensor that detects acceleration of the vehicle, or a sensor for detecting an operation amount of an accelerator pedal, an operation amount of a brake pedal, a steering angle of a steering wheel, an engine speed, a wheel rotation speed, or the like. The drive system control unit 7100 performs operation processing using a signal input from the vehicle condition detection section 7110, and controls an internal combustion engine, a driving motor, an electric power steering device, a brake device, or the like.

The body system control unit 7200 controls operation of various devices installed on the vehicle body in accordance with various programs. For example, the body system control unit 7200 functions as a control device of a keyless entry system, a smart key system, a power window device, or various lamps such as a headlamp, a tail lamp, a brake lamp, a turn signal, or a fog lamp. In this case, radio waves transmitted from a portable device that substitutes for a key or signals of various switches can be input to the body system control unit 7200. Upon receipt of such radio waves or signals, the body system control unit 7200 controls a door lock device, the power window device, the lamps, or the like of the vehicle.

The battery control unit 7300 controls a secondary battery 7310 in accordance with various programs, the secondary battery 7310 serving as a power supply source for the driving motor. For example, information such as a battery temperature, a battery output voltage, or a remaining battery capacity is input to the battery control unit 7300 from a battery device including the secondary battery 7310. The battery control unit 7300 performs operation processing using such signals, and performs temperature regulation control of the secondary battery 7310 or control of a cooling device or the like included in the battery device.

The vehicle-exterior information detection unit 7400 detects information regarding the exterior of the vehicle on which the vehicle control system 7000 is installed. For example, at least either an imaging section 7410 or a vehicle-exterior information detection section 7420 is connected to the vehicle-exterior information detection unit 7400. The imaging section 7410 includes at least one of a time of flight (ToF) camera, a stereo camera, a monocular camera, an infrared camera, or a camera of another type. The vehicle-exterior information detection section 7420 includes, for example, at least one of an environment sensor for detecting current weather or meteorological phenomena, or a surrounding information detection sensor for detecting another vehicle, an obstacle, a pedestrian, or the like around the vehicle on which the vehicle control system 7000 is installed.

The environment sensor may be, for example, at least one of a rain sensor that detects rainy weather, a fog sensor that detects fog, a sunshine sensor that detects intensity of sunshine, or a snow sensor that detects snowfall. The surrounding information detection sensor may be at least one of an ultrasonic sensor, a radar device, or a light detection and ranging, laser imaging detection and ranging (LIDAR) device. The imaging section 7410 and the vehicle-exterior information detection section 7420 may be each provided as a separate sensor or device, or may be provided as a device in which a plurality of sensors or devices is integrated together.

Figure 32:
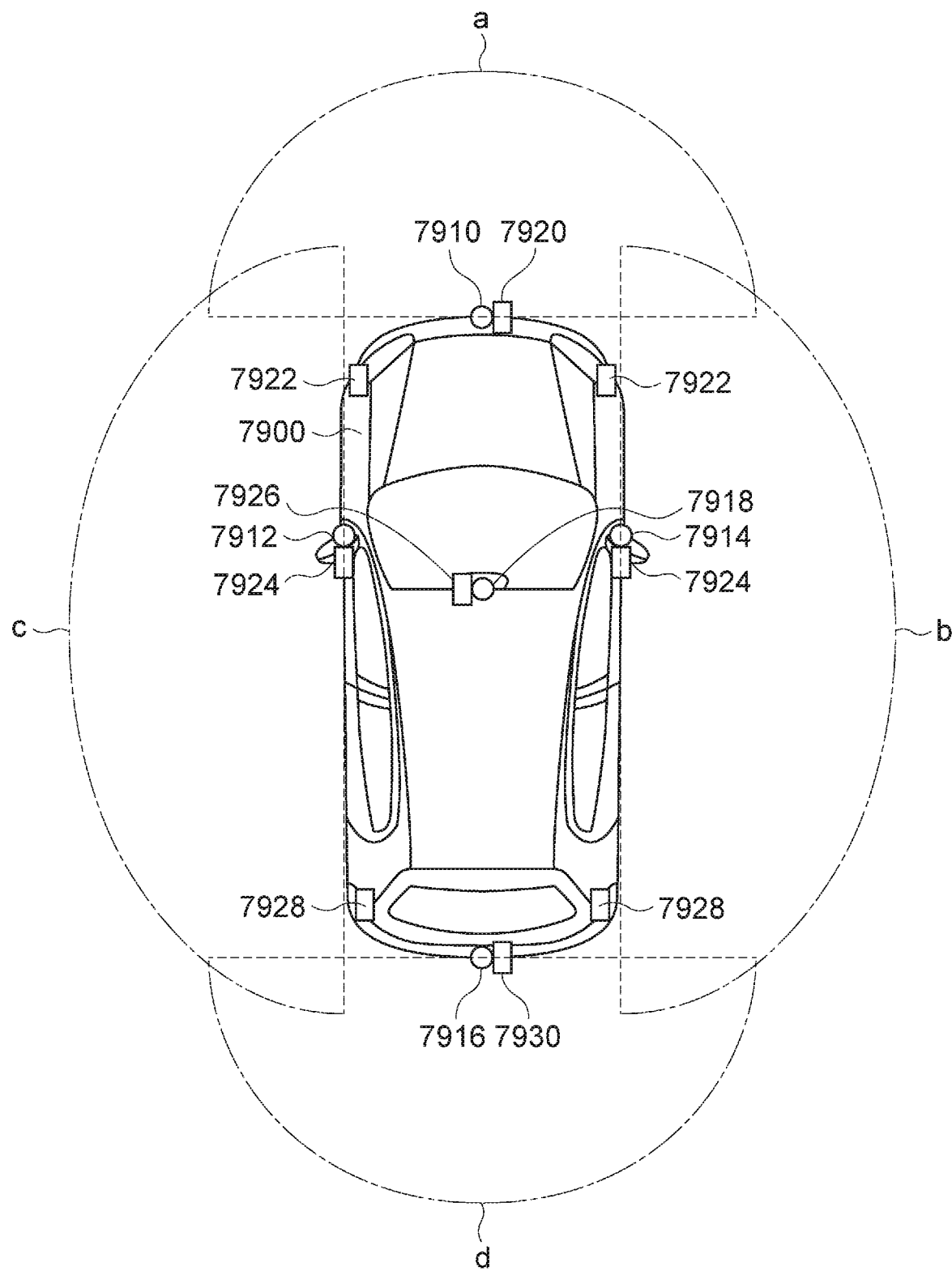
FIG. 32 is a diagram illustrating an example of an installation position of an imaging section.

Here, FIG. 32 illustrates an example of installation positions of the imaging section 7410 and the vehicle-exterior information detection section 7420. Imaging sections 7910, 7912, 7914, 7916, 7918 are provided, for example, at least one of a front nose, a side mirror, a rear bumper, a back door, or an upper portion of a windshield in a vehicle interior of the vehicle 7900. The imaging section 7910 provided at the front nose and the imaging section 7918 provided at the upper portion of the windshield in the vehicle interior mainly capture an image of a front view seen from the vehicle 7900. The imaging sections 7912, 7914 provided at the side mirrors mainly capture images of side views seen from the vehicle 7900. The imaging section 7916 provided at the rear bumper or the back door mainly capture an image of a rear view seen from the vehicle 7900. The imaging section 7918 provided at the upper portion of the windshield in the vehicle interior is mainly used to detect a preceding vehicle, a pedestrian, an obstacle, a traffic light, a traffic sign, a lane, or the like.

Note that FIG. 32 illustrates an example of an imaging range of each of the imaging sections 7910, 7912, 7914, 7916. An imaging range a indicates an imaging range of the imaging section 7910 provided at the front nose, imaging ranges b, c indicate imaging ranges of the imaging sections 7912, 7914 provided at the side mirrors, respectively, and an imaging range d indicates an imaging range of the imaging section 7916 provided at the rear bumper or the back door. For example, it is possible to obtain a bird's-eye view image of the vehicle 7900 by superimposing image data captured by the imaging sections 7910, 7912, 7914, 7916 on top of one another.

Vehicle-exterior information detection sections 7920, 7922, 7924, 7926, 7928, 7930 provided at the front, rear, sides, corners, and the upper portion of the windshield in the vehicle interior of the vehicle 7900 may be, for example, ultrasonic sensors or radar devices. The vehicle-exterior information detection sections 7920, 7926, 7930 provided at the front nose, the rear bumper, the back door, and the upper portion of the windshield in the vehicle interior of the vehicle 7900 may be, for example, LIDAR devices. Such vehicle-exterior information detection sections 7920 to 7930 are mainly used to detect a preceding vehicle, a pedestrian, an obstacle, or the like.

Returning to FIG. 31, the description will be continued. The vehicle-exterior information detection unit 7400 causes the imaging section 7410 to capture an image of an outside view seen from the vehicle, and receives the captured image data. Furthermore, the vehicle-exterior information detection unit 7400 receives detection information from the connected vehicle-exterior information detection section 7420. In a case where the vehicle-exterior information detection section 7420 is an ultrasonic sensor, a radar device, or a LIDAR device, the vehicle-exterior information detection unit 7400 transmits ultrasonic waves, electromagnetic waves, or the like, and receives information of received reflected waves. The vehicle-exterior information detection unit 7400 may perform object detection processing of detecting an object such as a person, a vehicle, an obstacle, a sign, or a character on a road surface or distance detection processing of detecting a distance to such an object on the basis of the received information. The vehicle-exterior information detection unit 7400 may perform environment recognition processing of recognizing rainfall, fog, a road surface condition, or the like on the basis of the received information. The vehicle-exterior information detection unit 7400 may calculate a distance to an object located outside the vehicle on the basis of the received information.

Furthermore, the vehicle-exterior information detection unit 7400 may perform image recognition processing of recognizing a person, a vehicle, an obstacle, a sign, a character on a road surface, or the like or distance detection processing of detecting a distance to such an object on the basis of the received image data. The vehicle-exterior information detection unit 7400 may perform processing such as distortion correction or registration on the received image data, and composite pieces of image data captured by different imaging sections 7410 to generate a bird's-eye view image or a panoramic image. The vehicle-exterior information detection unit 7400 may perform viewpoint conversion processing using pieces of image data captured by different imaging sections 7410.

The vehicle-interior information detection unit 7500 detects vehicle-interior information. For example, a driver condition detection section 7510 that detects a condition of a driver is connected to the vehicle-interior information detection unit 7500. The driver condition detection section 7510 may include a camera that captures an image of the driver, a biological sensor that detects biological information of the driver, a microphone that collects sound in the vehicle interior, or the like. The biological sensor is provided, for example, on a seat surface, a steering wheel, or the like, and detects biological information of an occupant sitting on a seat or the driver holding the steering wheel. The vehicle-interior information detection unit 7500 may calculate a degree of fatigue or a degree of concentration of the driver or may determine whether or not the driver is dozing on the basis of the detection information input from the driver condition detection section 7510. The vehicle-interior information detection unit 7500 may perform processing such as noise canceling processing on the collected sound signal.

The integrated control unit 7600 controls the overall operation in the vehicle control system 7000 in accordance with various programs. An input section 7800 is connected to the integrated control unit 7600. The input section 7800 is implemented by, for example, a device such as a touchscreen, a button, a microphone, a switch, or a lever that can be operated by the occupant for input. Data obtained as a result of voice recognition of voice input by the microphone may be input to the integrated control unit 7600. The input section 7800 may be, for example, a remote control device using infrared rays or other radio waves, or an external connection device such as a mobile phone or a personal digital assistant (PDA) compatible with the operation of the vehicle control system 7000. The input section 7800 may be, for example, a camera, and in this case, the occupant can input information by means of a gesture. Alternatively, data obtained as a result of detecting motion of a wearable device worn by the occupant may be input. Moreover, the input section 7800 may include, for example, an input control circuit or the like that generates an input signal on the basis of information input by the occupant or the like using the input section 7800 described above and outputs the input signal to the integrated control unit 7600. The occupant or the like operates the input section 7800 to input various data to the vehicle control system 7000 or to instruct the vehicle control system 7000 to perform processing operation.

The storage section 7690 may include a read only memory (ROM) that stores various programs to be executed by the microcomputer, and a random access memory (RAM) that stores various parameters, operation results, sensor values, and the like. Furthermore, the storage section 7690 may be implemented by a magnetic storage device such as a hard disc drive (HDD), a semiconductor storage device, an optical storage device, a magneto-optical storage device, or the like.

The general-purpose communication I/F 7620 is a general-purpose communication I/F for communications with various devices located in an external environment 7750. The general-purpose communication I/F 7620 may implement a cellular communication protocol such as global system of mobile communications (GSM) (registered trademark), WiMAX, long term evolution (LTE), or LTE-Advanced (LTE-A), or another wireless communication protocol such as wireless LAN (also referred to as Wi-Fi (registered trademark)) or Bluetooth (registered trademark). The general-purpose communication I/F 7620 may be connected to a device (for example, an application server or a control server) located on an external network (for example, the Internet, a cloud network, or a company-specific network) via, for example, a base station or an access point. Furthermore, the general-purpose communication I/F 7620 may be connected to a terminal (for example, a terminal of a driver, a pedestrian, or a store, or a machine type communication (MTC) terminal) located in the vicinity of the vehicle using, for example, a peer to peer (P2P) technology.

The private communication I/F 7630 is a communication I/F that supports a communication protocol designed for use in a vehicle. For example, the private communication I/F 7630 may implement a standard protocol such as wireless access in vehicle environment (WAVE) that is a combination of IEEE 802.11p of a lower layer and IEEE 1609 of an upper layer, dedicated short range communications (DSRC), or a cellular communication protocol. The private communication I/F 7630 typically performs V2X communications corresponding to a concept including at least one of vehicle to vehicle communications, vehicle to infrastructure communications, vehicle to home communications, or vehicle to pedestrian communications.

The positioning section 7640 receives, for example, a global navigation satellite system (GNSS) signal from a GNSS satellite (for example, a global positioning system (GPS) signal from a GPS satellite), performs positioning, and generates position information including the latitude, longitude, and altitude of the vehicle. Note that the positioning section 7640 may identify the current position by exchanging signals with a wireless access point, or may acquire position information from a terminal such as a mobile phone, a PHS, or a smartphone having a positioning function.

The beacon receiving section 7650 receives, for example, radio waves or electromagnetic waves transmitted from a radio station or the like installed on a road, and acquires information such as the current position, a traffic jam, a closed road, a required time, or the like. Note that the function of the beacon receiving section 7650 may be included in the private communication I/F 7630 described above.

The in-vehicle equipment I/F 7660 is a communication interface for connection between the microcomputer 7610 and various types of in-vehicle equipment 7760 located in the vehicle. The in-vehicle equipment I/F 7660 may establish wireless connection using a wireless communication protocol such as wireless LAN, Bluetooth (registered trademark), near field communication (NFC), or wireless USB (WUSB). Furthermore, the in-vehicle equipment I/F 7660 may establish wired connection such as universal serial bus (USB), high-definition multimedia interface (HDMI) (registered trademark), or mobile high-definition link (MHL) via a connection terminal (and, if necessary, a cable) not illustrated. The in-vehicle equipment 7760 may include, for example, at least one of mobile equipment or wearable equipment possessed by the occupant, or information equipment carried in or attached to the vehicle. Furthermore, the in-vehicle equipment 7760 may include a navigation device that searches for a route to any desired destination. The in-vehicle equipment I/F 7660 exchanges a control signal or a data signal with such in-vehicle equipment 7760.

The in-vehicle network I/F 7680 is an interface for communications between the microcomputer 7610 and the communication network 7010. The in-vehicle network I/F 7680 transmits and receives signals and the like in accordance with a predetermined protocol supported by the communication network 7010.

The microcomputer 7610 of the integrated control unit 7600 controls the vehicle control system 7000 in accordance with various programs on the basis of information acquired via at least one of the general-purpose communication I/F 7620, the private communication I/F 7630, the positioning section 7640, the beacon receiving section 7650, the in-vehicle equipment I/F 7660, or the in-vehicle network I/F 7680. For example, the microcomputer 7610 may calculate a control target value of the driving force generation device, the steering mechanism, or the braking device on the basis of the acquired information regarding the inside and outside of the vehicle, and output a control command to the drive system control unit 7100. For example, the microcomputer 7610 may perform coordinated control for the purpose of implementing a function of an advanced driver assistance system (ADAS) including vehicle collision avoidance or impact mitigation, follow-up traveling based on an inter-vehicle distance, traveling with the vehicle speed maintained, vehicle collision warning, vehicle lane departure warning, or the like. Furthermore, the microcomputer 7610 may perform coordinated control for the purpose of automated driving or the like in which the vehicle autonomously travels without depending on driver's operation by controlling the driving force generation device, the steering mechanism, the braking device, or the like on the basis of the acquired information regarding surroundings of the vehicle.

The microcomputer 7610 may generate three-dimensional distance information between the vehicle and an object such as a surrounding structure or a person on the basis of information acquired via at least one of the general-purpose communication I/F 7620, the private communication I/F 7630, the positioning section 7640, the beacon receiving section 7650, the in-vehicle equipment I/F 7660, or the in-vehicle network I/F 7680, and create local map information including surrounding information of the current position of the vehicle. Furthermore, the microcomputer 7610 may predict danger such as a collision of the vehicle, an approach to a pedestrian or the like, or an entry into a closed road on the basis of the acquired information, and generate a warning signal. The warning signal may be, for example, a signal for generating a warning sound or turning on a warning lamp.

The audio image output section 7670 transmits an output signal of at least one of a sound or an image to an output device capable of visually or audibly notifying the occupant of the vehicle or the outside of the vehicle of information. In the example illustrated in FIG. 31, an audio speaker 7710, a display section 7720, and an instrument panel 7730 are illustrated as output devices. The display section 7720 may include, for example, at least one of an on-board display or a head-up display. The display section 7720 may have an augmented reality (AR) display function. The output device may be another device other than such devices, such as a wearable device such as a headphone or an eyeglass-type display worn by the occupant, a projector, or a lamp. In a case where the output device is a display device, the display device visually displays results obtained by various processing performed by the microcomputer 7610 or information received from another control unit in various forms such as text, an image, a table, and a graph. Furthermore, in a case where the output device is an audio output device, the audio output device converts an audio signal including reproduced audio data, acoustic data, or the like into an analog signal and audibly outputs the analog signal.

Note that, in the example illustrated in FIG. 31, at least two control units connected over the communication network 7010 may be integrated into one control unit. Alternatively, each control unit may include a plurality of control units. Moreover, the vehicle control system 7000 may include another control unit (not illustrated). Furthermore, in the above description, some or all of the functions of any of the control units may be provided to another control unit. That is, as long as information is transmitted and received over the communication network 7010, predetermined operation processing may be performed by any of the control units. Similarly, a sensor or a device connected to any of the control units may be connected to another control unit, and the plurality of control units may mutually transmit and receive detection information over the communication network 7010.

An example of the vehicle control system to which the technology according to the present disclosure is applicable has been described above. The technology according to the present disclosure is applicable to, for example, the imaging sections 7910, 7912, 7914, 7916, 7918, the vehicle-exterior information detection sections 7920, 7922, 7924, 7926, 7928, 7930, the driver condition detection section 7510, and the like, among the above-described configurations. Specifically, the imaging system 10 illustrated in FIG. 1 including the imaging device of the present disclosure is applicable to such imaging sections and detection sections. Then, applying the technology according to the present disclosure allows a reduction in influence of the noise event such as sensor noise and allows reliable and quick detection of the occurrence of the true event, so that safe vehicle traveling can be achieved.

Note that the present technology may have the following configurations.

(1) An imaging device including:
a photoelectric conversion section including a plurality of photoelectric conversion elements, each of the plurality of photoelectric conversion elements being configured to photoelectrically convert incoming light into an electrical signal;
a first detection section that detect a detection signal in a case where an absolute value of an amount of change in the electrical signal generated by each of the plurality of photoelectric conversion elements exceeds a predetermined threshold;
a flicker determination section that determines whether or not a detection signal caused by a flicker of a light source is included in the detection signals detected by the first detection section; and
a second detection section that detects a detection signal caused by a factor other than the flicker, from among the detection signals detected by the first detection section, in a case where it is determined that the detection signal caused by the flicker is included.

(2) The imaging device according to (1), in which
the first detection section detects a first detection signal in a case where an absolute value of an amount of upward change in a signal level of the electrical signal exceeds a first threshold, and detects a second detection signal in a case where an absolute value of an amount of downward change in the signal level of the electrical signal exceeds a second threshold, and
the flicker determination section determines whether or not the detection signal caused by the flicker is included in the detection signals detected by the first detection section on the basis of a number of the first detection signals and a number of the second detection signals detected within a predetermined period.

(3) The imaging device according to (2), in which the first detection section sequentially reads the electrical signals of the plurality of photoelectric conversion elements, detects one of the first detection signal or the second detection signal, then detects the other of the first detection signal or the second detection signal, and counts the number of the first detection signals and the number of the second detection signals over the predetermined period.

(4) The imaging device according to (2), in which the first detection section sequentially reads the electrical signals of the plurality of photoelectric conversion elements, detects the first detection signal and the second detection signal in parallel, and counts the number of the first detection signals and the number of the second detection signals over the predetermined period.

(5) The imaging device according to (2), in which
the first detection section counts, over the predetermined period, the number of the first detection signals and the number of the second detection signals for the photoelectric conversion elements each having the absolute value of the amount of change exceeding the threshold among the plurality of photoelectric conversion elements, and
the flicker determination section determines whether or not the detection signal caused by the flicker is included in the detection signals detected by the first detection section on the basis of the number of the first detection signals and the number of the second detection signals counted by the first detection section.

(6) The imaging device according to (2), in which
the first detection section counts, over the predetermined period, a difference between the number of the first detection signals and the number of the second detection signals for the photoelectric conversion elements each having the absolute value of the amount of change exceeding the threshold among the plurality of photoelectric conversion elements, and
the flicker determination section determines whether or not the detection signal caused by the flicker is included in the detection signals detected by the first detection section on the basis of the difference counted by the first detection section.

(7) The imaging device according to any one of (1) to (6), further including:
a period detection section that detects a period of the flicker in a case where the flicker determination section determines that the detection signal caused by the flicker is included; and
a detection period setting section that sets a detection period of the detection signal in accordance with the period of the flicker detected by the period detection section, in which
the second detection section detects the detection signal in the detection period set by the detection period setting section.

(8) The imaging device according to any one of (1) to (6), further including:
a period detection section that detects a period of the flicker in a case where the flicker determination section determines that the detection signal caused by the flicker is included; and
a counter that increases or decreases a count value on the basis of the detection signal detected in the period of the flicker detected by the period detection section, and increases or decreases the count value on the basis of the detection signal detected at a timing other than the period of the flicker, in which
the second detection section detects the detection signal detected due to the factor other than the flicker on the basis of the count value.

(9) The imaging device according to (8), further including a signal selection section that selects the detection signal detected due to the factor other than the flicker on the basis of the count value in a case where the flicker determination section determines that the detection signal caused by the flicker is included, and selects the detection signal detected by the first detection section in a case where the flicker determination section determines that the detection signal caused by the flicker is not included.

(10) The imaging device according to any one of (2) to (6), in which the second detection section detects, as the detection signal caused by the factor other than the flicker, the detection signal in a case where the flicker determination section determines that the detection signal caused by the flicker is included and the absolute value of the amount of downward change in a signal level of the electrical signal exceeds the second threshold within a period in which the first detection signal is detected, or in a case where the flicker determination section determines that the detection signal caused by the flicker is included and the absolute value of the amount of upward change in the signal level of the electrical signal exceeds the first threshold within a period in which the second detection signal is detected.

(11) The imaging device according to any one of (1) to (10), further including an output rate conversion section that converts an output rate of the detection signal detected by the second detection section.

(12) The imaging device according to any one of (2) to (6), in which in a case where the flicker determination section determines that the detection signal caused by the flicker is included, the second detection section discards the detection signal caused by the flicker among the detection signals detected by the first detection section, and detects remaining detection signals.

(13) The imaging device according to (12), in which the second detection section discards the first detection signal and detects the second detection signal during a period in which the first detection signal is detected, and discards the second detection signal and detects the first detection signal during a period in which the second detection signal is detected.

(14) The imaging device according to (13), further including an output selection section that selects the second detection signal detected within the period in which the first detection signal is detected and the first detection signal detected within the period in which the second detection signal is detected in a case where the flicker determination section determines that the detection signal caused by the flicker is included, and selects the detection signal detected by the first detection section in a case where the flicker determination section determines that the detection signal caused by the flicker is included.

(15) An imaging method including detecting a detection signal in a case where an absolute value of an amount of change in an electrical signal generated by each of a plurality of photoelectric conversion elements exceeds a predetermined threshold, each of the plurality of photoelectric conversion elements being configured to photoelectrically convert incoming light into the electrical signal, determining whether or not a detection signal caused by a flicker of a light source is included in the detected detection signals, and detecting a detection signal caused by a factor other than the flicker from among the detected detection signals in a case where it is determined that the detection signal caused by the flicker is included.

Aspects of the present disclosure are not limited to the above-described individual embodiments, and include various modifications that can be conceived by those skilled in the art, and the effects of the present disclosure are not limited to the above-described contents. That is, various additions, modifications, and partial deletions can be made without departing from the conceptual idea and spirit of the present disclosure derived from the contents set forth in the claims and equivalents thereof.

REFERENCE SIGNS LIST

10 Imaging system
11 Imaging lens
12 Recording section
13 Control section
20 Imaging device
21 Pixel array section
22 Drive section
23 Arbiter section
24 Column processing section
25 Signal processing section
27 Readout area selection section
28 Signal generation section
Pixel 30
31 Light receiving section
32 Pixel signal generation section
33 Address event detection section
40 Control section
41 (411, 412) Operation circuit
42 Delay circuit
43 AND circuit
44 Multiplexer
51 First detection section
52 Flicker determination section
53 Second detection section
54 Flicker detection section
55 Event counter
56 Shift register
57 Output rate conversion section
58 Pixel control circuit
59 Counter map
59a Counter
60 Memory
61 Event selection section

The invention claimed is:

1. An imaging device, comprising:
a photoelectric conversion section including a plurality of photoelectric conversion elements, wherein each of the plurality of photoelectric conversion elements is configured to photoelectrically convert incoming light into an electrical signal;
a first detection section configured to detect a plurality of detection signals based on a determination that an absolute value of an amount of change in the electrical signal generated by each of the plurality of photoelectric conversion elements exceeds a specific threshold, wherein
a first detection signal of the plurality of detection signal is detected based on a determination that an absolute value of an amount of upward change in a signal level of the electrical signal exceeds a first threshold, and
a second detection signal of the plurality of detection signal is detected based on a determination that an absolute value of an amount of downward change in the signal level of the electrical signal exceeds a second threshold;
a flicker determination section configured to determine that a third detection signal by a flicker of a light source is included in the plurality of detection signals detected by the first detection section, wherein
the determination is based on a number of first detection signals and a number of second detection signals detected within a specific period,
the plurality of detection signals includes the number of first detection signals and the number of second detection signals,
the number of first detection signals includes the first detection signal, and
the number of second detection signals includes the second detection signal; and
a second detection section configured to detect, based on presence of the third detection signal, a fourth detection signal by a factor different from the flicker, from among the plurality of the detection signals detected by the first detection section.

2. The imaging device according to claim 1, wherein the first detection section is further configured to:
sequentially read the electrical signal of the plurality of photoelectric conversion elements;
detect the first detection signal;
detect the second detection signal after detection of the first detection signal; and
count the number of first detection signals and the number of second detection signals over the specific period.

3. The imaging device according to claim 1, wherein the first detection section is further configured to:
sequentially read the electrical signal of the plurality of photoelectric conversion elements;
detect the first detection signal and the second detection signal in parallel; and
count the number of first detection signals and the number of second detection signals over the specific period.

4. The imaging device according to claim 1, wherein
the first detection section is further configured to count, over the specific period, the number of first detection signals and the number of second detection signals for the photoelectric conversion elements each having the absolute value of the amount of change exceeding the specific threshold among the plurality of photoelectric conversion elements; and
the flicker determination section is further configured to determine, based on the number of first detection signals and the number of second detection signals, that the third detection signal by the flicker is included in the detection signals detected by the first detection section.

5. The imaging device according to claim 1, wherein
the first detection section is further configured to count, over the specific period, a difference between the number of first detection signals and the number of second detection signals for the photoelectric conversion elements each having the absolute value of the amount of change exceeding the specific threshold among the plurality of photoelectric conversion elements; and
the flicker determination section is further configured to determine, based on the difference counted by the first detection section, that the third detection signal by the flicker is included in the detection signals detected by the first detection section.

6. The imaging device according to claim 1, further comprising:
a period detection section configured to detect a period of the flicker based on the determination that the third detection signal by the flicker is included; and
a detection period setting section configured to set a detection period of the plurality of detection signals based on the period of the flicker detected by the period detection section, wherein
the second detection section is further configured to detect the plurality of detection signals in the detection period set by the detection period setting section.

7. The imaging device according to claim 1, further comprising:
a period detection section configured to detect, based on the presence of the third detection signal, a period of the flicker; and
a counter configured to increase or decrease a count value based on the third detection signal detected in the period of the flicker, wherein the count value is increased or decreased based on the fourth detection signal detected at a timing different from the period of the flicker, and
the second detection section is further configured to detect the fourth detection signal detected due to the factor different from the flicker based on the count value.

8. The imaging device according to claim 7, further comprising a signal selection section configured to:
select, based on the presence of the third detection signal, the fourth detection signal detected by the factor different from the flicker, wherein
the detection of the fourth detection signal is based on the count value; and
select, based on absence of the third detection signal, the plurality of detection signals detected by the first detection section.

9. The imaging device according to claim 1, wherein the second detection section is further configured to detect the fourth detection signal based on:
the presence of the third detection signal and the absolute value of the amount of downward change in the signal level of the electrical signal that exceeds the second threshold within a period in which the first detection signal is detected, or
the presence of the third detection signal and the absolute value of the amount of upward change in the signal level of the electrical signal that exceeds the first threshold within a period in which the second detection signal is detected.

10. The imaging device according to claim 1, further comprising an output rate conversion section configured to convert an output rate of the fourth detection signal detected by the second detection section.

11. The imaging device according to claim 1, wherein based on the presence of the third detection signal, the second detection section is further configured to:
discard the third detection signal by the flicker among the plurality of detection signals detected by the first detection section; and
detect remaining detection signals, wherein the remaining detection signals includes the plurality of detection signals except the third detection signal.

12. The imaging device according to claim 11, wherein the second detection section is further configured to:
discard the first detection signal and detect the second detection signal during a period in which the first detection signal is detected; and
discard the second detection signal and detect the first detection signal during a period in which the second detection signal is detected.

13. The imaging device according to claim 12, further comprising an output selection section that is configured to:
select, based on the presence of the third detection signal, the second detection signal detected within the period in which the first detection signal is detected;
select, based on the presence of the third detection signal, the first detection signal detected within the period in which the second detection signal is detected; and
select, based on the presence of the third detection signal, the plurality of detection signals detected by the first detection section.

14. An imaging method, comprising:
detecting a plurality of detection signals based on a determination that an absolute value of an amount of change in an electrical signal generated by each of a plurality of photoelectric conversion elements exceeds a specific threshold, wherein
a first detection signal of the plurality of detection signals is detected based on a determination that an absolute value of an amount of upward change in a signal level of the electrical signal exceeds a first threshold,
a second detection signal of the plurality of detection signals is detected based on a determination that an absolute value of an amount of downward change in the signal level of the electrical signal exceeds a second threshold, and
each of the plurality of photoelectric conversion elements is configured to photoelectrically convert incoming light into the electrical signal;
determining that a third detection signal by a flicker of a light source is included in the plurality of the detected detection signals, wherein
the determination is based on a number of first detection signals and a number of second detection signals detected within a specific period,
the number of first detection signals includes the first detection signal, and
the number of second detection signals includes the second detection signal; and
detecting, based on presence of the third detection signal, a fourth detection signal by a factor different from the flicker, from among the plurality of the detected detection signals.

* * * * *